(12) United States Patent
York et al.

(10) Patent No.: US 11,481,242 B2
(45) Date of Patent: Oct. 25, 2022

(54) SYSTEM AND METHOD OF FLOW SOURCE DISCOVERY

(71) Applicant: Virtual Instruments Worldwide, Inc., Palo Alto, CA (US)

(72) Inventors: Nicholas York, San Ramon, CA (US); Rosanna Lee, Palo Alto, CA (US); Vishal Neema, San Jose, CA (US); Xiaohong Pan, San Ramon, CA (US)

(73) Assignee: Virtual Instruments Worldwide, Inc., Palo Alto, CA (US)

( * ) Notice: Subject to any disclaimer, the term of this patent is extended or adjusted under 35 U.S.C. 154(b) by 0 days.

(21) Appl. No.: 17/014,878

(22) Filed: Sep. 8, 2020

(65) Prior Publication Data

US 2020/0409742 A1 Dec. 31, 2020

Related U.S. Application Data

(63) Continuation of application No. 16/234,402, filed on Dec. 27, 2018, now Pat. No. 10,768,970.

(Continued)

(51) Int. Cl.
*H04L 41/06* (2022.01)
*H04L 43/026* (2022.01)
(Continued)

(52) U.S. Cl.
CPC ........ *G06F 9/45558* (2013.01); *G06F 9/5077* (2013.01); *H04L 41/0233* (2013.01);
(Continued)

(58) Field of Classification Search
CPC ............... G06F 9/45558; G06F 9/5077; G06F 2009/4557; G06F 2009/45591;
(Continued)

(56) References Cited

U.S. PATENT DOCUMENTS 6,421,809 B1 7/2002 Wuytack et al.
6,480,470 B1 11/2002 Breivik
(Continued)

FOREIGN PATENT DOCUMENTS

EP 2262173 12/2010

OTHER PUBLICATIONS

International Application No. PCT/US2018/067760, Search Report and Written Opinion dated Mar. 8, 2019.
(Continued)

*Primary Examiner* — Yaotang Wang
(74) *Attorney, Agent, or Firm* — Ahmann Kloke LLP

(57) ABSTRACT

An example method comprises receiving flow packets from network traffic analyzing platforms, for each particular flow packet: identify the particular flow packet as belonging to one of at least two flow packet types based on a format, if the particular flow packet is sFlow, determine if the particular flow packet is an sFlow sample, counter record, or a third packet type, if the particular flow packet is the sFlow sample or counter record, identify a flow source of the particular flow packet and at least one metric, and update a flow source data structure else ignore the particular flow packet, and if the particular flow packet is a second flow packet type: if the particular flow packet is of a format that matches a template, identify the flow source, and update the flow source data structure to include the identified flow source and the at least one metric.

18 Claims, 10 Drawing Sheets

Related U.S. Application Data

(60) Provisional application No. 62/611,892, filed on Dec. 29, 2017.

(51) Int. Cl.

| | | |
|---|---|---|
| *H04L 47/2441* | (2022.01) | |
| *H04L 47/2483* | (2022.01) | |
| *H04L 43/0876* | (2022.01) | |
| *H04L 41/0896* | (2022.01) | |
| *H04L 41/14* | (2022.01) | |
| *H04L 43/12* | (2022.01) | |
| *H04L 43/16* | (2022.01) | |
| *H04L 67/1097* | (2022.01) | |
| *H04L 41/0233* | (2022.01) | |
| *H04L 41/0631* | (2022.01) | |
| *H04L 41/0681* | (2022.01) | |
| *G06F 9/455* | (2018.01) | |
| *G06F 9/50* | (2006.01) | |
| *H04L 67/10* | (2022.01) | |

(52) U.S. Cl.
CPC ............ *H04L 41/06* (2013.01); *H04L 41/065* (2013.01); *H04L 41/0681* (2013.01); *H04L 41/0896* (2013.01); *H04L 41/145* (2013.01); *H04L 43/026* (2013.01); *H04L 43/0876* (2013.01); *H04L 43/12* (2013.01); *H04L 43/16* (2013.01); *H04L 47/2441* (2013.01); *H04L 47/2483* (2013.01); *H04L 67/1097* (2013.01); *G06F 2009/4557* (2013.01); *G06F 2009/45591* (2013.01); *G06F 2009/45595* (2013.01); *H04L 67/10* (2013.01)

(58) Field of Classification Search
CPC ..... G06F 2009/45595; G06F 2209/508; G06F 9/5027; H04L 41/0233; H04L 41/06; H04L 41/065; H04L 41/0681; H04L 41/0896; H04L 41/145; H04L 43/026; H04L 43/0876; H04L 43/12; H04L 43/16; H04L 47/2441; H04L 47/2483; H04L 67/1097; H04L 67/10; H04L 41/0686; H04L 41/5035; H04L 43/103
See application file for complete search history.

(56) References Cited

U.S. PATENT DOCUMENTS

| | | |
|---|---|---|
| 6,499,107 B1 | 12/2002 | Gleichauf et al. |
| 7,185,192 B1 | 2/2007 | Kahn |
| 7,193,968 B1 | 3/2007 | Kapoor et al. |
| 7,634,595 B1 | 12/2009 | Brown |
| 7,711,822 B1 | 5/2010 | Duvur et al. |
| 7,783,740 B2 | 8/2010 | Siorek et al. |
| 8,065,133 B1 | 11/2011 | Asbridge |
| 8,495,611 B2 | 7/2013 | McCarthy |
| 8,589,552 B1 | 11/2013 | Jones et al. |
| 9,026,687 B1 | 5/2015 | Govande |
| 9,928,183 B2 | 3/2018 | Svendsen |
| 10,044,566 B1 | 8/2018 | Grisco |
| 10,216,812 B2 | 2/2019 | Witkop |
| 10,505,959 B1 | 12/2019 | Wang |
| 10,735,430 B1 | 8/2020 | Stoler |
| 2002/0083169 A1 | 6/2002 | Aki |
| 2002/0156883 A1 | 10/2002 | Natarajan |
| 2003/0095504 A1 | 5/2003 | Ogier |
| 2003/0167327 A1 | 9/2003 | Baldwin |
| 2004/0083285 A1 | 4/2004 | Nicolson |
| 2005/0081208 A1 | 4/2005 | Gargya |
| 2005/0229182 A1 | 10/2005 | Grover |
| 2006/0184626 A1 | 8/2006 | Agapi |
| 2006/0242647 A1 | 10/2006 | Kimbrel |
| 2006/0271677 A1 | 11/2006 | Mercier |
| 2007/0136541 A1 | 6/2007 | Herz |
| 2008/0019499 A1 | 1/2008 | Benfield |
| 2008/0104248 A1 | 5/2008 | Yahiro |
| 2009/0016236 A1* | 1/2009 | Alcala ................. H04L 43/0876 370/253 |
| 2009/0025004 A1 | 1/2009 | Barnard et al. |
| 2009/0106256 A1 | 4/2009 | Safari |
| 2009/0125909 A1 | 5/2009 | Li et al. |
| 2009/0241113 A1 | 9/2009 | Seguin |
| 2009/0259749 A1 | 10/2009 | Barrett |
| 2009/0319580 A1 | 12/2009 | Lorenz |
| 2010/0248771 A1 | 9/2010 | Brewer et al. |
| 2011/0107148 A1 | 5/2011 | Franklin |
| 2011/0141119 A1 | 6/2011 | Ito |
| 2011/0225017 A1 | 9/2011 | Radhakrishnan |
| 2012/0030352 A1 | 2/2012 | Sauma Vargas |
| 2012/0044811 A1 | 2/2012 | White |
| 2012/0076001 A1 | 3/2012 | Saitou |
| 2012/0089726 A1 | 4/2012 | Doddavula |
| 2012/0131593 A1 | 5/2012 | DePetro |
| 2012/0192197 A1 | 7/2012 | Doyle |
| 2012/0221810 A1 | 8/2012 | Shah et al. |
| 2013/0054221 A1 | 2/2013 | Artzi et al. |
| 2013/0060932 A1 | 3/2013 | Ofek |
| 2013/0067089 A1 | 3/2013 | Synytskyy et al. |
| 2013/0117847 A1 | 5/2013 | Friedman |
| 2013/0152200 A1 | 6/2013 | Alme |
| 2013/0285855 A1 | 10/2013 | Dupray et al. |
| 2014/0112187 A1 | 4/2014 | Kang |
| 2014/0164957 A1 | 6/2014 | Shin et al. |
| 2014/0173034 A1 | 6/2014 | Liu |
| 2014/0331277 A1 | 11/2014 | Frascadore |
| 2014/0358972 A1 | 12/2014 | Guarrieri et al. |
| 2015/0074251 A1 | 3/2015 | Tameshige |
| 2015/0222527 A1 | 8/2015 | Shah et al. |
| 2016/0004475 A1 | 1/2016 | Beniyama |
| 2016/0044035 A1 | 2/2016 | Huang |
| 2016/0100066 A1 | 4/2016 | Yamada |
| 2016/0119234 A1 | 4/2016 | Valencia Lopez |
| 2016/0275642 A1 | 9/2016 | Abeykoon et al. |
| 2016/0359897 A1 | 12/2016 | Yadav |
| 2017/0053076 A1 | 2/2017 | Lulla et al. |
| 2017/0085456 A1 | 3/2017 | Whitner |
| 2017/0123849 A1 | 5/2017 | Tian |
| 2017/0168866 A1 | 6/2017 | Kono |
| 2017/0293414 A1 | 10/2017 | Pierce et al. |
| 2017/0317899 A1* | 11/2017 | Taylor .................... H04L 41/12 |
| 2018/0067776 A1 | 3/2018 | Chen |
| 2018/0081501 A1 | 3/2018 | Johnston |
| 2018/0115585 A1 | 4/2018 | Rubakha |
| 2018/0130202 A1 | 5/2018 | Wang et al. |
| 2018/0165451 A1 | 6/2018 | Kawakita |
| 2018/0262432 A1 | 9/2018 | Ozen |
| 2018/0322415 A1 | 11/2018 | Bendre et al. |
| 2018/0324045 A1 | 11/2018 | Grisco |
| 2018/0329794 A1 | 11/2018 | Prieto et al. |
| 2019/0065230 A1 | 2/2019 | Tsirkin |
| 2019/0073239 A1 | 3/2019 | Konnath |
| 2019/0089617 A1 | 3/2019 | Raney |
| 2019/0163589 A1 | 5/2019 | McBride |
| 2019/0171509 A1 | 6/2019 | Hardy et al. |
| 2019/0207837 A1 | 7/2019 | Malhotra |
| 2019/0207841 A1 | 7/2019 | Perkowski |
| 2019/0243671 A1 | 8/2019 | Yadav |

OTHER PUBLICATIONS

International Application No. PCT/US2019/058976, Search Report and Written Opinion dated Mar. 25, 2020.
International Application No. PCT/US2019/059282, Search Report and Written Opinion dated Apr. 7, 2020.
Androulidakis, G. et al., "Improving Network Anomaly Detection via Selective Flow-Based Sampling," IET Communications, vol. 2, No. 3, pp. 399-409, Mar. 2008.
Cejka, Tomas et al., "NEMEA: A Framework for Network Traffic Analysis," Proceedings of the 12th Conference on Network and Service Management (CNSM 2016), pp. 195-201, Nov. 2016.

(56) References Cited

OTHER PUBLICATIONS

Chandramouli, Ramaswamy, "Security Assurance Requirements for Hypervisor Deployment Features," Seventh International Conference on Digital Society, Feb. 2013.

Kind, Andreas et al., "Histogram-Based Traffic Anomaly Detection," IEEE Transactions on Network Service Management, vol. 6, No. 2, pp. 110-121, Jun. 2009.

Ramamoorthy, S. et al. "A Preventive Method for Host Level Security in Cloud Infrastructure," Proceedings of the 3rd International Symposium on Big Data and Cloud Computing Challenges, Feb. 2016.

Sethi, Chhabi et al., "Trusted-Cloud: A Cloud Security Model for Infrastructure as a Service (IaaS)," International Journal of Advanced Research in Computer Science and Software Engineering, vol. 6, No. 3, Mar. 2016.

Urias, Vincent E. et al., "Hypervisor Assisted Forensics and Incident Response in the Cloud," 2016 IEEE International Conference on Computer and Information Technology, Dec. 2016.

Wang, Wei et al., "Network Traffic Monitoring, Analysis and Anomaly Detection," Guest Editorial, IEEE Network, pp. 6-7, May 2011.

Bhumip Khasnabish "Emerging Enterprise Storage Systems: Storage or System Area Networks (SANs)", [Online], pp. 192-195, [Retrieved from Internet on Aug. 25, 2021], , (Year: 2002).

Suresh Muknahallipatna et al., "The Effect of End to End Latency in a Distributed Storage Area Network on Microsoft Exchangew Server 2003 Performance", [Online], pp. 1-9, [Retrieved from Inter3ent on Aug. 25, 2021], (Year: 2004).

T. Brothers, N. Mandagere et al.,"Microsoft Exchange Implementation on a Distributed Storage Area Network", [Online], pp. 251-251, [Retrieved from Internet on Aug. 25, 2021], (Year: 2008).

Vladimir V. Riabov, "Storage Area Networks (SANs)", [Online], pp. 1-11, [Retrieved from Internet on Aug. 25, 2021], (Year: 2005).

* cited by examiner

SYSTEM AND METHOD OF FLOW SOURCE DISCOVERY

CROSS-REFERENCE TO RELATED APPLICATIONS

The present application is a continuation of U.S. patent application Ser. No. 16/234,402, filed Dec. 27, 2018 and entitled, "SYSTEM AND METHOD OF FLOW SOURCE DISCOVERY," which claims benefit of U.S. Provisional Patent Application No. 62/611,892, filed Dec. 29, 2017 and entitled "SYSTEMS AND METHODS FOR PERFORMANCE MANAGEMENT OF DATA INFRASTRUCTURE," which is incorporated by reference herein. In addition, the following applications filed on Dec. 27, 2018 are incorporated by reference herein: U.S. Nonprovisional patent application Ser. No. 16/234,353 entitled "SYSTEM AND METHOD OF APPLICATION DISCOVERY," U.S. Nonprovisional patent application Ser. No. 16/234,384 entitled "SYSTEMS AND METHODS OF APPLICATION-AWARE IMPROVEMENT OF STORAGE NETWORK TRAFFIC," U.S. Nonprovisional patent application Ser. No. 16/234,424 entitled "SYSTEM AND METHOD OF DYNAMICALLY ASSIGNING DEVICE TIERS BASED ON APPLICATION," U.S. Nonprovisional patent application Ser. No. 16/234,440 entitled "SYSTEMS AND METHODS OF DISCOVERING AND TRAVERSING COEXISTING TOPOLOGIES," and U.S. Nonprovisional patent application Ser. No. 16/234,452 entitled "SYSTEM AND METHOD OF CROSS-SILO DISCOVERY AND MAPPING OF STORAGE, HYPERVISORS AND OTHER NETWORK OBJECTS."

FIELD OF THE INVENTION

Embodiments of the present invention related generally to discovering data flow sources and destinations on an enterprise system.

BACKGROUND

Complexity of enterprise networks has increased to a point where even information technology (IT) administrators may not have a clear picture of the network utilization of the enterprise network. Enterprise networks are increasingly moving towards a combination of on-premise and cloud-based infrastructure, making the ability to determine computing and storage resources associated with business-related application more difficult.

Corporations demand acceptable levels of performance, reliability, redundancy, and security from its computing and storage devices. One way to achieve performance, reliability, and redundancy is to provide more resources than the computing environment would ever need. Unfortunately, the cost of IP equipment, software and personnel can be prohibitively expensive, and would run contrary to an overall goal of an enterprise of profitability. Every corporation must strike a balance between their the cost of additional computing and storage versus performance, reliability and redundancy benefits of the additional computing and storage resources.

One way for IT administrators to monitor aspects of the increasingly complex enterprise network is with assistance from a wide variety of standalone and integrated software tools available to aid in the monitoring various aspects of the enterprise network. However, in traditional network monitoring systems, the IT administrator may need to configure the network monitoring system. The configuration may include notifying the network monitoring system of elements of the switch fabric (such as switches or routers) to monitor, the version of the monitoring software integrated into the switches, and the metrics that the network monitoring software will output.

As the enterprise networks get increasingly complex, routers or other elements of the switch fabric may be left out of the configuration of the network monitoring system. The disadvantage of these traditional network monitoring systems is that by manually informing the monitoring system the switches or routers to observe, the real potential bottlenecks of the network may be missed. Furthermore, each software tool, whether standalone or integrated, may have a vested interest in protecting their intellectual property, and not allowing their respective software to share information with others. In addition, by informing the network monitoring system of the metrics of interest, the "bigger picture" may be missed.

Further, each of the variety of traditional network monitoring systems available to a user of the enterprise network may provide data relevant only to a specific device, or type of device, making it difficult to obtain a complete view of data traffic.

For example, when a user complains of slow response of a virtual desktop application of the enterprise network, the IT administrator may run a diagnostic using a network monitoring system to determine the routers and switches connecting the physical servers, cloud servers and storage devices on using network performance monitoring tools. The network performance monitoring tools may determine that performance issues exist on the switch fabric of the enterprise network. A common solution to the issue may be to increase the number of routers and switches of the enterprise network in order to increase the bandwidth capacity. Increasing the number of routers and switches, however, may not result in an improvement in response time of the virtual desktop application. The monitoring system connected to the router may not be able to pin point a reason for the slow response of the virtual desktop application since this software would only have access to traffic data on specific routers, and not the performance of other entities that impact performance of the virtual desktop application. For example, the reason for the slow response of the virtual desktop application may be a particular server connected to a router associated with performance of a VDI application. That particular server may be taking up the utilization bandwidth of the router. The network performance monitoring tool may not be able to identify the server as impacting performance and, as such, the reason for the slow response of the virtual desktop application is actually obscured.

SUMMARY

An example system comprise one or more processors. The memory containing instructions configured to control the one or more processors to receive a period of time for flow source discovery of an enterprise network, receive a plurality of flow packets from network traffic analyzing platforms, the network traffic analyzing platforms being in communication with the enterprise network, the plurality of flow packets indicating network traffic into and out of flow sources of the enterprise network, at least one flow source of the flow sources of the enterprise network being a router or switch fabric integrated within the enterprise network, for each particular flow packet of the plurality of flow packets:

identify the particular flow packet of the plurality of flow packets as belonging to one of at least two flow packet types based at least in part on a format of the particular flow packet, if the particular flow packet is an sFlow flow packet, determine if the particular flow packet is an sFlow sample, an sFlow counter record, or a third sFlow packet type, if the particular flow packet is the sFlow sample or the sFlow counter record, identify a flow source of the particular flow packet and at least one metric of the network traffic data, the flow source being one of a plurality of flow sources of the enterprise network, and update a flow source data structure to include the identified flow source and the at least one metric of the network traffic data, if the particular flow packet is the third sFlow packet type, ignore the particular flow packet, and if the particular flow packet is a second flow packet type, the second flow packet type being different from an sFlow flow packet type: if the particular flow packet is of a format that matches one of a plurality of template records stored in a template datastore, identify the flow source associated with the particular flow packet and at least one metric of the network traffic data, and update the flow source data structure to include the identified flow source and the at least one metric of the network traffic data, and if the format of the particular flow packet does not match one of the plurality of template records, ignore the flow particular packet, and after termination of the period of time, output the flow source data structure, the flow source data structure combining information from the sFlow flow packets and information from the flow packets of the second flow packet type, the flow source data structure indicating a plurality of flow sources including the identified flow sources as well as a plurality of attributes of the network traffic data based on the at least one metric of the network traffic data of the plurality of flow packets, the flow source data structure enabling an operator of the enterprise network to control and monitor network traffic of the enterprise network.

In various embodiments, the system further comprising wherein the metrics of the network traffic data including at least one of a source entity of the enterprise network, a destination entity of the enterprise network, the source entity being one of a plurality of entities of the enterprise network and the destination entity of the enterprise being one of the plurality of entities of the enterprise network. In some embodiments, the system further comprising the metrics of the network traffic data including at least one of a type of flow source, read speed total byte count, incoming byte count, outgoing byte count, incoming bit rate, outgoing bit rate, and total packet rate.

In some embodiments, the memory containing instructions further configured to control the one or more processors to: identifying a first flow packet of one of at least two packet types, the first flow packet indicating a first flow source, a first value of a first metric of the network traffic data and a first value of a second metric of the network traffic data, identifying a second flow packet of one of at least two packet types, the second flow packet indicating a second flow source, the first value of the first metric of the network traffic data, and the first value of the second metric of the network traffic data and determining that the first flow packet and the second flow packet represent duplicate network traffic. In one embodiment, the first flow packet and the second flow packet are of different packet types. In another embodiment, the first flow packet and the second flow packet are of the same packet type.

In various embodiments, the flow source data structure is a table. In some embodiments, the flow source data structure is a chart. In one embodiment, the second flow packet type is a Netflow packet. In some embodiments, the second flow packet type is a Jflow packet.

An example method comprises receiving a period of time for flow source discovery of an enterprise network, receiving a plurality of flow packets from network traffic analyzing platforms, the network traffic analyzing platforms being in communication with the enterprise network, the plurality of flow packets indicating network traffic into and out of flow sources of the enterprise network, at least one flow source of the flow sources of the enterprise network being a router of switch fabric integrated within the enterprise network, for each particular flow packet of the plurality of flow packets: identify the particular flow packet of the plurality of flow packets as belonging to one of at least two flow packet types based at least in part on a format of the particular flow packet, if the particular flow packet is an sFlow flow packet, determine if the particular flow packet is an sFlow sample, an sFlow counter record, or a third sFlow packet type, if the particular flow packet is the sFlow sample or the sFlow counter record, identify a flow source of the particular flow packet and at least one metric of the network traffic data, the flow source being one of a plurality of flow sources of the enterprise network, and update a flow source data structure to include the identified flow source and the at least one metric of the network traffic data, if the particular flow packet is the third sFlow packet type, ignore the particular flow packet, and if the particular flow packet is a second flow packet type, the second flow packet type being different from an sFlow flow packet type: if the particular flow packet is of a format that matches one of a plurality of template records stored in a template datastore, identify the flow source associated with the particular flow packet and at least one metric of the network traffic data, and update the flow source data structure to include the identified flow source and the at least one metric of the network traffic data, and if the format of the particular flow packet does not match one of the plurality of template records, ignore the flow particular packet, and after termination of the period of time, output the flow source data structure, the flow source data structure combining information from the sFlow flow packets and information from the flow packets of the second flow packet type, the flow source data structure indicating a plurality of flow sources including the identified flow sources as well as a plurality of attributes of the network traffic data based on the at least one metric of the network traffic data of the plurality of flow packets, the flow source data structure enabling an operator of the enterprise network to control and monitor network traffic of the enterprise network.

An example computer program product comprising a computer readable storage medium having program code embodied therewith, the program code executable by a computing system to cause the computing system to perform: receiving a period of time for flow source discovery of an enterprise network, receiving a plurality of flow packets from network traffic analyzing platforms, the network traffic analyzing platforms being in communication with the enterprise network, the plurality of flow packets indicating network traffic into and out of flow sources of the enterprise network, at least one flow source of the flow sources of the enterprise network being a router of switch fabric integrated within the enterprise network, for each particular flow packet of the plurality of flow packets: identify the particular flow packet of the plurality of flow packets as belonging to one of at least two flow packet types based at least in part on a format of the particular flow packet, if the particular flow packet is an sFlow flow packet, determine if the particular flow packet is an sFlow sample, an sFlow counter record, or a third sFlow packet type, if the particular flow packet is the sFlow sample or the sFlow counter record, identify a flow source of the particular flow packet and at least one metric of the network traffic data, the flow source being one of a plurality of flow sources of the enterprise network, and update a flow source data structure to include the identified flow source and the at least one metric of the network traffic data, if the particular flow packet is the third sFlow packet type, ignore the particular flow packet, and if the particular flow packet is a second flow packet type, the second flow packet type being different from an sFlow flow packet type: if the particular flow packet is of a format that matches one of a plurality of template records stored in a template datastore, identify the flow source associated with the particular flow packet and at least one metric of the network traffic data, and update the flow source data structure to include the identified flow source and the at least one metric of the network traffic data, and if the format of the particular flow packet does not match one of the plurality of template records, ignore the flow particular packet, and after termination of the period of time, output the flow source data structure, the flow source data structure combining information from the sFlow flow packets and information from the flow packets of the second flow packet type, the flow source data structure indicating a plurality of flow sources including the identified flow sources as well as a plurality of attributes of the network traffic data based on the at least one metric of the network traffic data of the plurality of flow packets, the flow source data structure enabling an operator of the enterprise network to control and monitor network traffic of the enterprise network.

DETAILED DESCRIPTION

Various embodiments provide customers to deliver on complex requirements of their application infrastructure. Systems discussed herein may provide insights into the performance and availability of the end-to-end system— across physical, virtual and cloud environments. The system may intelligently capture, correlate, and/or analyze both breadth and depth of data, transforming data regarding an assets/applications of an enterprise network into answers and actionable insights. This allows the promotion of performance-based Service Level Agreements, changing the value of the infrastructure. With these insights, user may be able to take control of their environment, accurately inform collaborative dialogues, and drive business outcomes.

Figure 5:
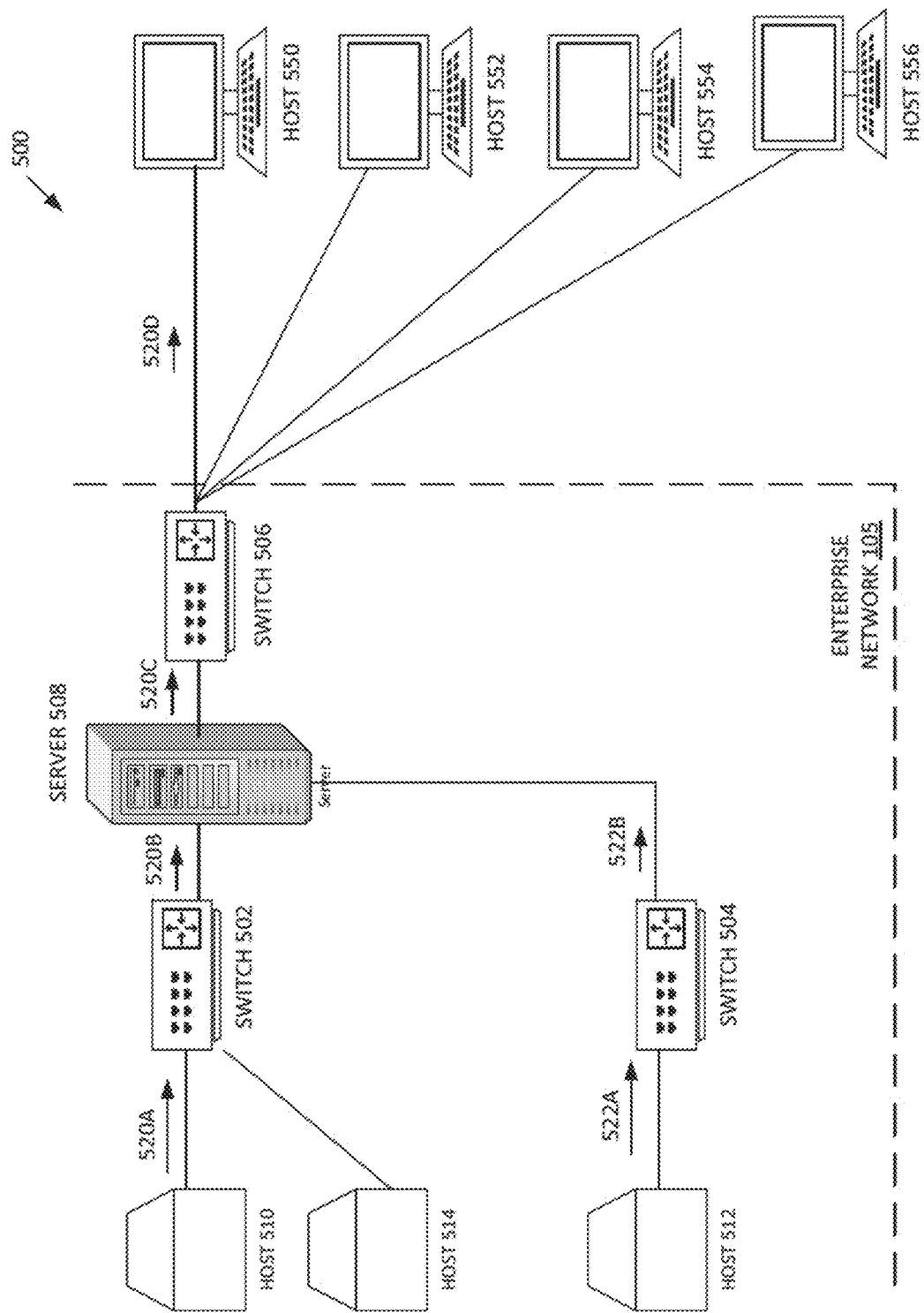
FIG. 5 depicts a block diagram of an example enterprise system according to some embodiments.

A network traffic monitoring system may be used to give IT administrators an awareness of data traffic flowing through the routers and switches of an enterprise network. A flow in an enterprise network may represent a communication between a source internet protocol (IP) address and a destination IP address. In some examples, the flow is a communication between a source IP address and a transmission control protocol (TCP) port. In other examples, the flow represents a communication between a source device and a destination device. In some embodiments, the flow is a continuous conversation between the source IP address and the destination IP address or the TCP port. The flow may be represented in a topology as a data path. FIG. 5 depicts an example of a flow that includes a communication between a source IP address representing host 510 and a destination IP address representing host 550. In this example, the flow includes data paths 520A, 520B, 520C, and 520D.

A flow source may be any switch or router (e.g., network device) in the data path that may provide a view of the flow and may generate a flow record for each flow. In one example, a switch fabric may include any number of network devices (e.g., switch or router) and therefore any number of flow sources.

It will be appreciate that there may be any number of flow sources in a data path. In one example, FIG. 5 depicts a first router that is connected to a source device, and a second router that is connected to a destination device. In FIG. 5, switch 502 and switch 506 may each be flow sources of the flow which includes 520A, 520B, 520C, and 520D.

A flow record documents communication between entities of the enterprise network. Entities are logical and intuitive groupings of systemwide devices and workloads that may be based on function, correlation, and/or interdependency. Entities enable users to logically group system-wide resources, from physical devices to application workloads, in order to provide the authoritative insights required to understand how resources and applications are performing. IT teams may configure entities to show all of the resources supporting a specific application, business unit, or tier of service.

The flow record may be provided by one or more flow sources found along the data path. Each flow record may include statistics or metrics regarding a particular flow, including but not limited to, IP address, destination IP address, next hop address, number of bytes, and/or the duration of the communication. In some embodiments, the flow source may aggregate one or more flows between the same source IP address and the destination IP address into one single flow with an aggregation of statistics or metrics.

There are different types of flow records and formatted in different ways. Cisco routers are often integrated with traffic monitoring software such as a NetFlow software platform. Traffic monitoring software such as NetFlow and the like may be configured to package one or more data packets into an export flow record. For example, the NetFlow software platform may include several components including a flow exporter, a flow collector, and an analysis application. The flow exporter may aggregate flow records into one or more data packets. The flow collector may collect, store, and pre-process flow data from the flow records received from the flow exporter. The analysis application may receive flow data and analyze the flow data. The flow source discovery system may retrieve data from the flow record received from the flow exporter. The flow source discovery system may receive data packets from one or more traffic monitoring software such as a NetFlow software platform.

In some embodiments, an IT administrator may schedule a data flow source discovery process and determine the start, end, and/or duration of the data flow source discovery process. A data flow discovery process is a process in which sources of data flow (e.g., flow sources) are identified within an enterprise network (e.g., including local, remote, and/or cloud components). In some embodiments, the IT administrator may schedule a data flow source discovery process for a period of time such as 24 hours. In various embodiments, the period of time is 5 days, 7 days, or 1 month.

In various embodiments, the data flow source discovery system may receive data packets from a particular traffic monitoring software (e.g., the particular traffic monitoring software may be determined by the IT administrator or by the data flow source discovery) as well as data packets from other sources (e.g., other traffic monitoring software and/or data packets received from probes within the enterprise network). The data flow source discovery system may then retrieve data from the data packets using different templates for data packets from different traffic monitoring software and then construct a topology and/or listing of flow sources, communication with flow sources, and entities that communicate with or through flow sources.

In some embodiments, the flow source discovery process may obtain real time views of the network traffic of the enterprise network, and allow the IT administrator to determine causes of slow-flowing networks. For example, the flow source discovery process may identify flow sources as well as current metrics associated with data flowing from flow sources, performance of the flow sources, or performance of entities (e.g., applications and/or devices executing specific applications) to enable the IT administrator to identify failing hardware, improperly configured systems, bandwidth hogs, and/or congestion due to increased network traffic. The flow source discovery system may determine an amount of bandwidth consumed by a particular IP node, determine the bandwidth usage of specific applications, and/or determine network anomalies such as distributed denial of service (DDoS) attacks, SPAM, BotNets, abnormal downloads/uploads, etc.

As discussed herein, the flow source discovery system may be configured to identify flow sources of the enterprise network. In other words, the flow source discovery system may detect and identify routers or switches (e.g., network devices) of the enterprise network and identify the network utilization of various entities of the network traffic.

In the traditional network monitoring system, the IT administrator may be required to manually identify the routers or switches of the enterprise network to monitor. As the complexity of enterprise networks increase, routers or switches of the enterprise network which may be the cause of network traffic bottle necks may be missed by the traditional network monitoring system. By relying on the flow source discovery to identify routers, switches and other flow sources of the enterprise network, the chances of inadvertently leaving out a business critical component of the switch fabric will be reduced. Similarly, devices and entities that impact performance can be more readily identified. As a result of this technical solution to a technical problem, systems and methods discussed herein address a problem that has been created by computer technology.

In some embodiments, the results of the flow source discovery process may be used in an analysis of discovering applications on the enterprise network. The flow source discovery process may provide real-time visibility into the network utilization of entities and applications across physical, virtual, and cloud computing environments.

For example, the flow source discovery process may determine the impact of hosts on other hosts and determines how those impacts may affected applications and storage. A host is any device on the enterprise network that may offer information resources, services, and applications to users or other nodes on the network.

The flow source discovery process may deduplicate flow records from redundant flow sources which can misrepresent an actual amount of traffic reported. This may be an issue that arises when a router or switch in the enterprise network is being monitored by more than one instance of or type traffic monitoring software.

The flow source discovery process may collect traffic data in the form of data packets from a wide variety of routers and switches manufactured by different companies. The data packets collected from the variety of routers may be in different formats. The flow source discovery system may assess the data packets to identify the flow sources responsible for generating the flow records. The results of the data flow source discovery process may be used to detect network anomalies, control bandwidth utilization, optimize application performance, and/or troubleshoot problems. Examples of network anomalies include DDoS attacks, SPAM, BotNets, abnormal downloads/uploads, or the like. The data flow source discovery system may control bandwidth utilization by monitoring data traffic metrics, and providing alarms or alerts for various data traffic metrics such as read response time, fabric transmission errors, link errors, link transmission errors, network usage rate, port utilization, etc.

The flow source discovery process may provide a user of the enterprise system the ability to configure which attributes of the flow source (e.g., data traffic metrics) that the user is interested in.

In some embodiments, an initial flow source discovery process may be initiated when the flow source discovery system is first introduced to enterprise network. In the initial flow source discovery process, the flow source discovery system may identify flow sources of the enterprise network as well as a set of attributes or data traffic metrics for any number of flow sources. The data traffic metric may include, for example, total byte count, incoming/outgoing byte count, incoming/outgoing bit rate, total packet rate, and/or incoming/outgoing endpoint count. The flow source discovery system may output the data traffic metrics in the form of a data structure (e.g., data table, graph, or other structure). The flow source discovery process may provide the identified flow sources in the form of a chart or a table. In some embodiments, the flow source discovery process may organize and output the data traffic metrics. For example, the flow source discovery process may provide top conversations as seen by each software platform such as NetFlow, top IP address by total bit rate, and top IP address by receive or transmit bit rate.

In response to the output of the identified flow sources and their associated attributes, the flow source discovery process may receive feedback from the IT administrator. In some embodiments, the received feedback includes a list of entities of the switch fabric to continue monitoring. The received feedback may also include a second list containing attributes of switch fabric for continued monitoring. The user of the enterprise system may determine a subset of entities of the switch fabric and the data traffic metrics associated with the entities of the switch fabric that the user wants to monitor based on an initial output of the flow source discovery system. In subsequent flow source discovery processes, a flow source discovery system may only monitor entities of the switch fabric that the user chooses. In some embodiments, in subsequent flow source discovery processes, the flow source discovery system may output only selected (i.e., subscribed) data traffic metrics.

The flow source discovery system may aid in discovering applications of the enterprise network by using heuristic analysis to determine possible roles of network endpoints. For example, the data flow source discovery system may determine that a particular group of IP addresses are communicating with four particular servers, specifically, on port 443 of the four particular servers. Through heuristic analysis, the application discovery system 180 of FIG. 1 may determine that the four particular servers may be web servers or a combination of different servers performing different functions.

Figure 1:
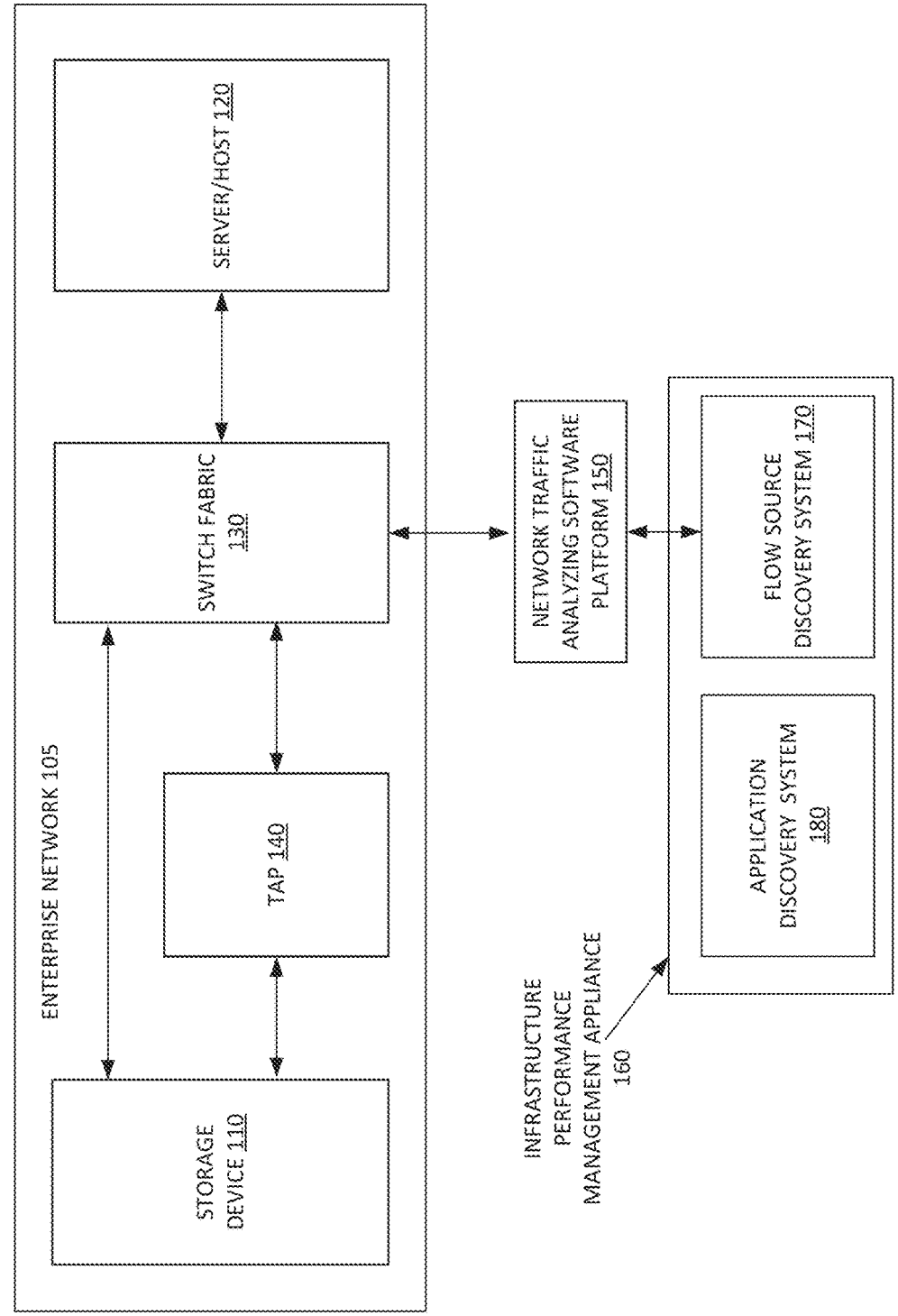
FIG. 1 depicts a block diagram of an enterprise system capable of discovering data flow sources of the enterprise system.

FIG. 1 depicts a block diagram of an enterprise system 100 including a flow source discovery system 170 capable of discovering data flow sources of the enterprise system. In this example, the enterprise system 100 comprises an enterprise network 105, a network traffic analyzing software platform 150, and an infrastructure performance management (IPM) appliance 160. The enterprise network 105 includes a storage device 110, a server/host 120, a switch fabric 130, and a traffic access points (TAP) 140. The IPM appliance 160 includes a flow source discovery system 170 and an application discovery system 180.

Storage devices 110 of the enterprise system 100 includes any number of storage devices that stores data. In one embodiment, the storage devices 110 includes a disk array. In some embodiments, the storage devices 110 includes a storage array network (SAN). In various embodiments, the storage device is cloud storage.

Server/host 120 may be any digital device with an instance of an operating system. In some embodiments, one of any number of hosts 120 may be a physical computer managed by Microsoft Windows. Hosts 120 may include instances of UNIX, Red Hat, Linux and others. In some embodiments, hosts 120 may include one or more virtual machines.

The switch fabric 130 may provide communication between any two entities of the enterprise system 100 such as the storage devices 110, the server/host 120, the TAP 140 and the network traffic analyzing software platform 150. The switch fabric 130 may use packet switching to receive, process and forward data from a source device to a destination device. The switch fabric 130 may refer to switches (e.g., flow sources) that are used to direct and assist in communication of information of the enterprise network 105.

The TAP 140 may provide connectivity to links between storage ports of the storage device 110 and switches of switch fabric 130. In various embodiments, the TAP 140 may provide connectivity on both sides of fabric-based storage virtualizers. The TAP 140 is an optical splitter which provides a copy of data passing through a fiber optic channel of the enterprise network 105 without affecting the integrity of the data. The fiber optic channel connecting storage devices with servers of the enterprise network. The copy may be used for real time performance monitoring of the traffic travelling through the fiber optic channel.

The network traffic analyzing software platform 150 may discover flow sources on the enterprise network 105. The network traffic analyzing software platform 150 may be any third-party platform that is integrated into routers or switches by their respective manufacturers to aid users in monitoring performance of traffic data entering and exiting that specific switching hardware. An example of a network traffic analyzing software platform 150 is Netflow. Although the network traffic analyzing software platform 150 of a particular provider may perform some flow source detection, the network traffic analyzing software platform 150 may provide only limited information about the flow sources (e.g., limited metrics) and may not include other switches of other manufacturers (i.e., that are not a part of that particular providers network traffic analyzing software platform 150).

In some embodiments, the IT administrator of the enterprise network 105 may schedule flow source discovery process to occur during specified times of the day and/or during particular days of the week. The network traffic analyzing software platform 150 (e.g., NetFlow) may include components such as a flow exporter, a flow collector and an analysis application. NetFlow and other may have different flow exporters, flow collectors, and analysis applications which exports, collects, and analyzes data packets in different ways, and may focus on different aspects of the data traffic metrics.

The flow exporter may aggregate flow records into data packets and export data packets to one or more flow collectors. The flow exporter may aggregate flow records with the same IP source address and the same IP destination address over a period of time. For example, if two IP addresses have 100 different conversation during a one minute interval, these 100 different conversations may not be saved as 100 flow records. The flow exports may save the 100 different conversations as one flow record with an aggregate set of data traffic metrics. In some embodiments, the flow exporter outputs a new flow record when it determines that a flow is finished. This may be accomplished by flow aging. For example, when a router detects new data traffic for an existing flow, the router may reset an aging counter. In various embodiments, a TCP session termination signal in a TCP flow causes the router to determine that the flow is finished. The network traffic analyzing software platform 150 may be configured to output a flow record at a fixed interval even if the flow is still ongoing.

The flow collector may collect, store, and pre-process flow data from the flow records received from the flow exporter. The analysis application may receive and analyze the flow data. In some embodiments, the flow collector may package any number of flow records into any number of data packets.

The flow source discovery system 170 may receive a request to initiate a flow source discovery process of the enterprise network 105. This request may occur after the IPM appliance 160 is first installed into the enterprise network 105. In some embodiments, once initiated, the flow source discovery process may continue until it is completed, and subsequent flow source discovery processes may run according to a schedule or at predetermined times as controlled by the IT administrator. The flow source discovery system 170 may determine that the flow source discovery process is complete after retrieving traffic data from the one or more network traffic analyzing software platform(s) for a predetermined interval of time.

In some embodiments, the flow source discovery system 170 may receive any number of data packets from the flow collector of the network traffic analyzing software platform 150 and divert at least a portion of the signals being transmitted from the flow exporter component to the flow collector component. The flow source discovery system 170 may assess any number of data packets and determine a flow type. A flow type is a type of packet based on a type of a network traffic analyzing software platform. For example, a flow type may be a NetFlow packet, an sFlow data packet, Jflow data packet, Cflow data packet, or other type of packet. The NetFlow data packet may be generated by the NetFlow software platform found in Cisco switching hardware. The sFlow data packet may be generated by software platform found in Juniper switching hardware. The Cflow data packet may be generated by a software platform found in switching hardware manufactured by Alcatel-Lucent.

The flow source discovery system 170 may identify the type of data packet and parse the flow records from the data packet using a template (e.g., to retrieve needed data from the correct portions of the data packet). The template is a map indicating how all or some information within a data packet may be formatted. Without a template, information from the data packet may not be retrieved because the information will not be in an understood location within the packet. Similarly, if the template is not correct, information from the data packet may not be retrieved.

In some embodiments, the data packet includes any number of flow records, a template record, and a packet header. Any number of flow records may provide information associated with each flow. In various embodiments, the data packet includes one or more template identifiers.

Each of the flow records may be generated by one of any number of flow sources in a data path. The data path may include any number of flow sources, and may result in duplicate flow records. The flow source discovery system 170 may optionally deduplicate any duplicate flow records which may misrepresent the actual amount of data traffic that is reported.

A template record may be used to recognize a format of the subsequent flow records that may be received in the current or future data packets. For example, there may be different formats (e.g., and therefore different template records to recognize the different formats) for sFlow data packets, Jflow data packets, and Cflow data packets. In various embodiments, different versions of the same type of data packet may have different templates. For example, there are multiple versions of Cisco's NetFlow software platform, and each version may have a different template record because data from different versions of the platform may have different formats. In some embodiments, the flow source discovery system 170 may need to match the template record of an incoming data packet with a template record stored in the flow source discovery system 170 before the incoming data packet can be parsed. In some embodiments, the flow source discovery process may reject a data packet if data packet does not include a template record that the flow source discovery system 170 recognizes. A template record is data including or identifying a template.

A packet header may include information regarding the packet, such as the version of the network traffic analyzing software platform associated with the data packet, the number of flow records contained within the data packet, and a sequence number. The sequence number may aid in detecting lost data packets.

A template identifier (ID) may be a number which may distinguish one template record from other template records produced by the same export device. A flow collector may receive export packets from different switching hardware devices, and the uniqueness of template records may not be guaranteed across different switching hardware devices. In some embodiments, the flow collect may store the IP address of the switching hardware device that produced the template ID in order to assist in the enforcement of uniqueness.

In order to parse the data packet to obtain any number of flow records, the flow source discovery system 170 may match a template record to a format of a data packet in order to parse the received data packet. In some embodiments, the flow source discovery system 170 scans a header of the data packet to identify a template. The flow source discovery system 170 may retrieves data from a data packet based on a template and then determine if the retrieved data includes expected information. Once the correct template is identified, the template may be used to assist in parsing information from the data packet.

The result of the parsing of the data packet may be a flow record representing a communication between two entities of the enterprise network 105. The flow source discovery system 170 may validate the flow record and discover and/or identify a flow source of the enterprise network 105, along with attributes (e.g., metrics) associated with the discovered flow source. The attributes associated with the discovered flow source may include the type of flow source, total byte count, incoming/outgoing byte count, incoming/outgoing bit rate, total packet rate and/or incoming/outgoing endpoint count. In some embodiments, all or some attributes may be found in the flow record. In various embodiments, the flow source discovery system 170 may assess flow records to identify performance attributes based on data from an identified flow source in order to generate attributes/metrics regarding the flow source (e.g., generate the attributes/metrics in real time for current performance and/or generate aggregations of attributes/metrics to show performance over time).

The flow source discovery system may provide the discovered flow sources and attributes/metrics associated with the discovered flow sources in the form of a table or a chart. In some embodiments, the flow source discovery system may provide attributes/metrics of the discovered flow sources, or data traffic metrics in a meaningful way and output graphs organizing top IP address by total bit rate, top conversations as seen by the network traffic analyzing software platform 150 (e.g., NetFlow), etc. In an example output 900 of FIG. 9, the flow source discovery system is configured to output top IP by receive bit rate as seen by NetFlow in the form of a chart in area 930 of FIG. 9.

In some embodiments, the flow source discovery system may determine that the flow source discovery process is completed, or is suspended when any number of trigger conditions is satisfied. The trigger conditions may include, for example, a scheduled flow source discovery time frame has passed or input from the user to suspend or end the flow source discovery process. The flow source discovery system may suspend the flow source discovery process when the end of the flow source discovery time frame has ended.

The flow source discovery system 170 may receive input from the user of the enterprise network 105 to suspend or end the flow source discovery process. In some embodiments, the flow source discovery process is suspended when an entity utilization of a predetermined number of entities of the switch fabric 130 is greater than an entity utilization threshold (e.g., a desired number of entities is found). In some embodiments, a flow source discovery process may be suspended until the current time equals the beginning of a subsequent scheduled flow source discovery time frame.

The application discovery system 180 may receive from the flow source discovery system 170 possible roles of network endpoints. These possible network endpoint roles may be used by the application discovery system 180 to discover applications through heuristic analysis. For example, data received from a known flow source (e.g., discovered by the flow source discovery system 170) may be assessed to determine what applications provided and/or received information from the data. Data received from a known flow source may be, in one example, intercepted or copied from a TAP that interfaces with communication paths of the enterprise network 105. Based on that information as well as the type of communication, the frequency of communication, and/or the like, the application discovery system 180 or the flow source discovery system 170 may label a network endpoint with one or more roles performed within the enterprise network 105.

Figure 2:
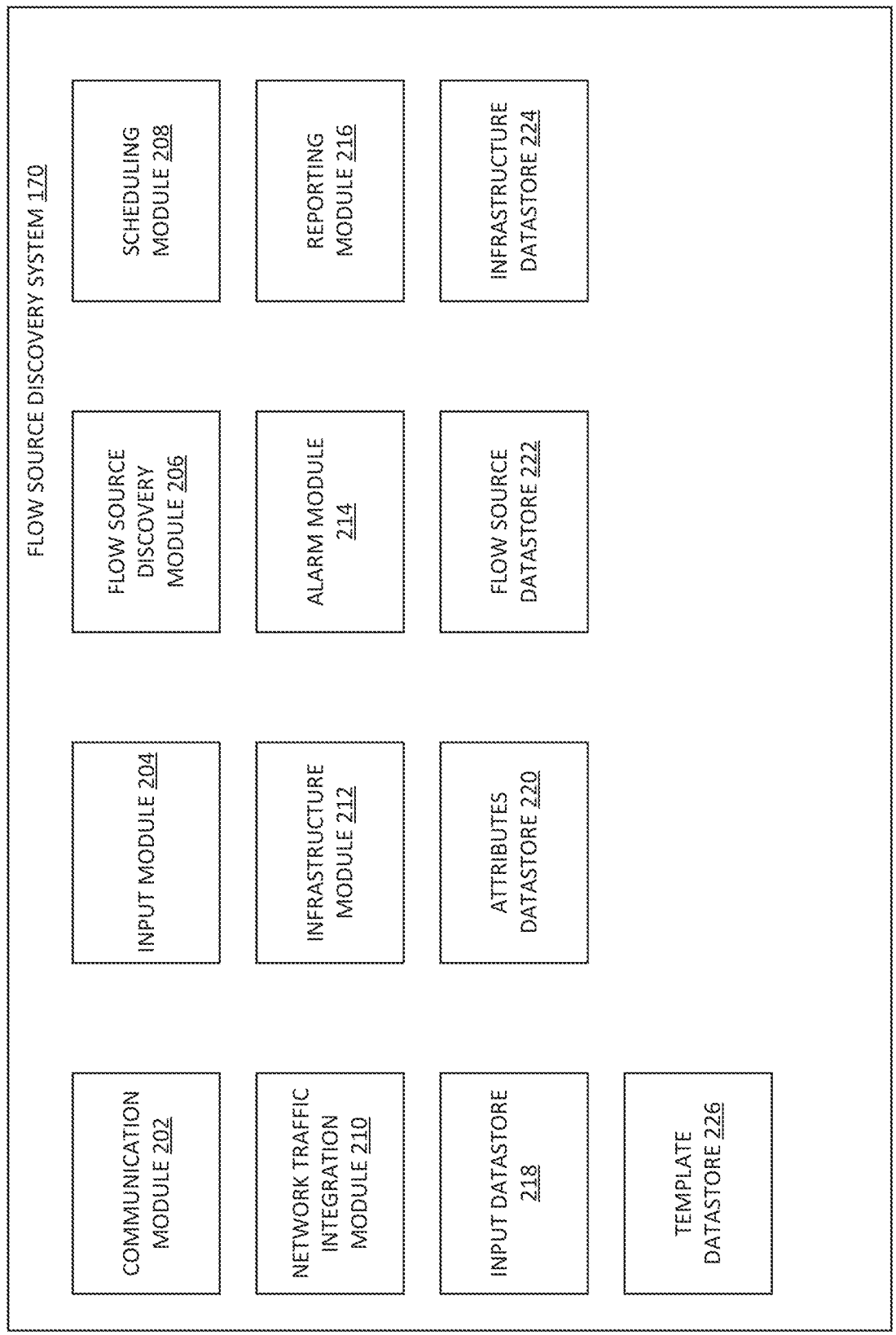
FIG. 2 depicts a block diagram of an example of a flow source discovery system according to some embodiments.

FIG. 2 depicts a block diagram of an example of a flow source discovery system 170 according to some embodiments. The flow source discovery system 170 includes a communication module 202, a input module 204, a flow source discovery module 206, a scheduling module 208, a network traffic integration module 210, an infrastructure module 212, an alarm module 214, a reporting module 216, an input datastore 218, an attributes datastore 220, a flow source datastore 222, an infrastructure datastore 224, and a template datastore 226.

The communication module 202 may send and receive requests or data between any of the network traffic analyzing software platform 150, the application discovery system 180 and the flow source discovery system 170. The communication module 202 may receive a request from the IT administrator of the enterprise network 105 to schedule a flow source discovery process to start at a specified day of the week and/or time of the day and/or duration. The communication module may send the request received from the IT administrator to the scheduling module 208.

The communication module 202 may receive from the network traffic analyzing software platform 150 any number of data packets and optionally send any number of data packets to the input datastore 218. In some embodiments, the communication may send the received plurality of data packets from the network traffic analyzing software platform 150 to the flow source discovery module 206.

During the flow source discovery process, the flow source discovery module 206 may reject or ignore one or more of the received data packets. In one example, when the flow source discovery module 206 rejects one or more data packets, the communication module 202 may send a request from to the input datastore 218 to delete one or more of any number of data packets if the data packets were previously stored.

During the flow source discovery process, the flow source discovery module 206 may discover flow sources of the enterprise network 105 based on metadata from the data packet. In some embodiments, when the flow source discovery module 206 discovers and identifies a flow source, the communication module 202 may send a request to the flow source datastore 222 to update or create a flow source entry within a data structure to track and identify the flow source as well as any number of attributes and/or metrics.

As attributes associated or metrics with discovery of flow sources are determined by the flow source discovery module 206, the attributes or metrics may include connectivity between the discovered flow source and other flow sources of the enterprise network 105. In some embodiments, the communication module 202 may send to the infrastructure datastore 224 a request to create an entity entry or update an existing entity entry in the data structure (e.g., flow source data structure). In the process of flow source discovery, the connectivity of entities of the enterprise network may require updating, since the flow source discovery process may uncover new or previously unknown connections of entities of the enterprise network 105. A flow source data structure may include identified flow sources, attributes and/or metrics of any number of flow sources, roles, related applications, entities that use each flow source, and/or network topology information indicating when one or more flow sources communicate, how they perform, which applications, hosts, or entities communicate with the flow sources, and the like.

When the flow source discovery process is complete, the communication module 202 may send a request from the flow source discovery module 206 to the flow source datastore 222 to output the discovered flow source and their associated attributes (e.g., in a table, chart, graph, or the like). In some embodiments, the communication module 202 may send the request from the flow source discovery module 206 to the flow source datastore 222 to provide the discovered flow source and their associated attributes as the flow source is discovered by the flow source discovery module 206. In some embodiments, the communication module 202 may receive a query from a user to display a portion of the enterprise network 105, indicate relationships within the enterprise network 105, indicate real-time performance, or the like.

The communication module 202 may receive a result of the flow source discovery process from the flow source discover module 206. The result of the flow source discovery process module 206 may include data packets from one or more network traffic software platforms such as NetFlow and/or other platforms. In some embodiments, the data packet includes one or more flow records, at least one template record, and/or a packet header. The one or more flow records provides information associated with each flow. In various embodiments, the data packet includes any number of template identifiers.

In some embodiments, the communication module 202 may receive a request from the scheduling module 208 to suspend the flow source discovery process when the flow source discovery time frame is over. The flow source discovery time frame may be suspended or terminated based on a satisfied trigger condition which triggers commencement or suspension of the flow source discovery process.

The input module 204 may be configured to initiate the flow source discovery process (e.g., based on receiving a request from the IT administrator of the enterprise network 105). In some embodiments, the input module 204 is configured to send the flow source discovery process initiation request to the flow source discovery module 206. The input module 204 may send a request to the flow source discovery module 206 to commence or suspend the flow source discovery process.

In some embodiments, the input module 204 receives a schedule of the flow source discovery process. The input module 204 may receive the flow source discovery process schedule from an example flow source discovery interface 600 depicted in FIG. 6. By interacting with field 610, the flow source discovery process may be scheduled. Pull-down field 620 may specify a day of the week, date, time, or the like that the flow source discovery process may be schedule. A start time of the flow source discovery process can be chosen using pull-down field 630 or any combination of changeable entries.

In response to the output of the flow source discovery process, the input module 204 may receive information from a user (e.g., IT administrator of the enterprise network 105). The received information may include a list of entities of the switch fabric 130 that the IT administrator would like to continue monitoring. In some embodiments, the input module 204 may receive from the IT administrator, a second list of attributes of the switch fabric which the IT administrator would like to continue monitoring.

The flow source discovery module 206 may manage the flow source discovery process. The flow source discovery module 206 may commence the flow source discovery process when the flow source discovery module 206 determines that any number of trigger conditions is satisfied. For example, a trigger condition may include the scheduling module 208 determining that a current time equals a scheduled flow source discovery start time. In some embodiments, one of the trigger conditions includes receiving from the input module 204 a request to commence the flow source discovery process. Upon the reception of the request to commence the flow source discovery from the scheduling module 208 or the input module 204, the flow source discovery module 206 may commence the flow source discovery process.

The flow source discovery module 206 may suspend the flow source discovery process when the flow source discovery module 206 determines that a trigger condition is satisfied. A trigger condition may include the scheduling module 208 determining that a current time equals the scheduled flow source discovery end time. In some embodiments, one of the trigger conditions includes receiving from the input module 204 a request to suspend the flow source discovery process. Upon the reception of the request to commence the flow source discovery from the scheduling module 208 or the input module 204, the flow source discovery module 206 may suspend the flow source discovery process.

In various embodiments, the ability to suspend the flow source discovery process, whether an initial discovery process or a subsequent discovery process, enables any number of devices on the enterprise network 105 to reserve computing resources when needed for critical or daily tasks. The process may be suspended based on system utilization, time (e.g., evenings between 2-5 AM when the system is apt to be less utilized), requirements of other services (e.g., security or backup), weekends, or the like. In some embodiments, the flow source discovery process may be resumed from where the process was suspended thereby avoiding a need to repeat a portion of the process (e.g., a portion of the network being examined for flow sources) that was recently completed.

The flow source discovery module 206 may provide to the IT administrator of the enterprise network 105, the ability to configure which attributes of the flow source that the IT administrator is interested in monitoring. During an initial flow source discovery process the flow source discovery module 206 may monitor and provide the set of attributes or data traffic metrics of discovered flow sources. The set of attributes may include a type of flow source, total byte count, incoming/outgoing byte count, incoming/outgoing bit rate, total packet rate and/or incoming/outgoing endpoint count. In a flow source discovery process subsequent to the initial flow source discovery process, the flow source discovery module 206 may receive from the IT administrator a second list containing attributes of the switch fabric which the IT administrator would like to continue monitoring. For example, the IT administrator may only be interested in monitoring the total packet rate of entities of the switch fabric 130. Based on the lists, the flow source discovery system 170 may continue to receive or intercept data packets from flow sources of interest, from specific areas of the network, or the like in order to further assess and provide results of the assessment to the requesting entity (e.g., the IT administrator that provided the list(s)).

The flow source discovery module 206 may receive data packets from the network traffic integration module 210. The flow source discovery module 206 may perform a flow source discovery process using the received plurality of data packets. In some embodiments, the flow source discovery module 206 may receive any number of data packets directly from the network traffic analyzing software platform 150.

In some examples, the flow source discovery module 206 may determine if one or more flow packets comes from a blocked entity of the switch fabric. During an initial flow source discovery process, the flow source discovery module 206 may analyze flow records subsequent to the initial flow source discovery process. The input module 204 may receive from the IT administrator a list of entities of the switch fabric that the IT administrator would like to continue monitoring and/or a list of entities of the switch fabric that the IT administrator would not like to monitor. The input module may send the list to the flow source discovery module 206. The flow source discovery process may ignore or reject flow records or data packets from entities of the switch fabric 130 not on the list to monitor (e.g., that are blocked).

For example, the flow source discovery module 206 may provide discovered flow sources, such as switches 502, 504, and 506 in the form of flow source entries. The flow source entries may include attributes and/or metrics of the discovered flow source such as the connectivity of these switches and attributes such as type of switch, the incoming/outgoing bit rate, total packet rate, etc. The application discovery system 180 may use heuristic analysis to determine that host 512 is taking up a majority server utilization of the server 508, thereby slowing down the web server application of the enterprise network. The application discovery system 180 may also determine that the host 512 is running a legacy operating system and that switch 504 is not coupled to any other entities of the enterprise network 105. The flow source discovery system 170 may be used in conjunction to the application discovery system 180 to improve the efficiency of server 508 by removing switch 504 from the enterprise network 105 or changing the connectivity of switch 504 to a different server (not pictured). In response to the output of the discovered flow source entries and their associated attributes, the flow source discovery module 206 may receive from the IT administrator of the enterprise network 105 a list of entities of the switch fabric which excludes switch 504.

The flow source discovery module 206 may determine the type of network traffic analyzing software platform that an incoming data packet comes from. This may be determined by recognizing the format of the incoming data packet. The format of the data packet from a network traffic analyzing software platform, such as NetFlow may be different from the format of the data packet from a second network traffic analyzing software platform. In some embodiments, the flow source discovery module 206 is capable of recognizing network software analyzing software platforms such as J-Flow, Netstream, Cflow, Rflow, and/or others.

The flow source discovery module 206 may reject data packets and flow records. For example, the flow source discovery module 206 may reject data packets if the format of the data packets do not match at least one template record or if a flow record of the data packet is from a blocked entity of the switch fabric 130.

The flow source discovery module 206 may assess flow records from data packets to discover flow sources of the enterprise network 105 based on metadata from the flow records of the data packet. In response to discovering a flow source of the enterprise network, the flow source discovery module 206 may send a request to the flow source datastore 222 to create or update a flow source entry. The flow source entry may include type of flow source, source IP, and/or a destination IP of flows passing through the discovered flow source. The flow source discovery module 206 may provide information to determine the amount of bandwidth being consumed by a specific entity of the switch fabric 130. The flow source discovery module 206 may determine network services being used in the enterprise network 105.

The flow source discovery module 206 may determine that the switch 502 is connected between the hosts 510 and 514, and the server 508, and the switch 506 is connected between the server 508 and a plurality of hosts 550, 552, 554, and 556. The network traffic integration module 210 may determine through heuristic analysis of data flowing to or from any number of flow sources that the server 508 may be a web server.

Duplicate flow records may misrepresent the actual amount of traffic reported. For example, in the example system 500, the network traffic integration module 210 may receive data packets containing flow records from multiple flow sources (e.g., switch 502 and switch 506). A subset of the flow records, such as a flow records representing data path 520A, from host 510 to from switch 502 may be duplicated in switch 506. The flow record representing data path 520A may include a source IP of the IP address of host 510 and a destination IP of the IP address of host 550. The network traffic integration module 210 may receive data packets containing flow records from switch 506 including a second flow record. The second flow record representing data path 520C may include the source IP of the IP address of host 510 and the destination IP of the IP address of host 550. The flow source discovery module 206 may recognize that the first flow record and the second flow records are duplicates. The flow source discovery module 206 may deduplicate the duplicate flow records (i.e., delete one of the two duplicate flow records or duplication of information from the flow records).

As the flow source discovery module 206 discover flow sources of the enterprise network 105 and their associated attributes and/or metrics such as connectivity with other entities of the enterprise network including storage device 110 and server/host 120. The flow source discovery module 206 may discover new connections and/or entities of the enterprise network 105. These new connections and/or entities of the enterprise network 105 may be used to determine the infrastructure of the enterprise network 105. In some embodiments, the discovery module 206 sends a request to infrastructure module 212 which determines the infrastructure of the network 105 to initiate the infrastructure topology process. As discussed herein, the discovery module 206 may receive information from any number of taps of communication paths (e.g., fiber optic cabling) and assess the information in view of the identified flow sources to identify and assess connections and/or entities of the enterprise network 105.

The discovery module 206 may perform any of these operations manually (e.g., by a user interacting with a GUI) and/or automatically (e.g., triggered by one or more of the modules 206-236, discussed herein). In some embodiments, the discovery module 206 comprises a library of executable instructions, which are executable by one or more processors for performing any of the aforementioned management operations. Like the other modules described herein, some or all of the functionality of the discovery module 206 may be implemented and/or included within one or more other modules and/or systems.

The scheduling module 208 is configured to receive from the input module 204, the schedule of the flow source discovery process and determine the start time, end time, and time to suspend the flow source discovery process. The user interact with the example flow source discovery interface 600 of FIG. 6 to specify the frequency and start time of a scheduled flow source discovery process.

By interacting with field 610, the flow source discovery process may be scheduled. Pull-down field 620 may specify the day of the week that the flow source discovery process may be schedule. A start time of the flow source discovery process can be chosen using pull-down field 630. Field 640 outputs the day and time of the last failed flow source discovery process, while field 650 outputs the day and time of the last successful flow source discovery process. A flow source discovery process may be considered a failure if the flow source discovery process is not able to proceed. The flow source discovery process may not be able to proceed if the flow source discovery system 170 is not able to connect with the network traffic analyzing software platform 150, or if the network traffic analyzing software platform 150 is unable to entities of the switch fabric 130.

The network traffic integration module 210 may receive from network traffic analyzing software platform 150, IP network traffic data from a network traffic software platform. NetFlow is an example network traffic software platform integrated within Cisco routers. There may be any number of different versions of the NetFlow software.

The network traffic integration module 210 may send a request to store the received network traffic data in input datastore 218. In some embodiments, the received network traffic data may be in the format of data packets.

Software platforms may log and/or transmit flow records which, in some embodiments, is a summary of the interaction between two IP addresses. The network traffic integration module 210 may retrieve flow records between IP addresses of the enterprise system 100 from switches enabled with network traffic software (e.g., by calling an API of the network traffic software within the switch).

These flow records may be analyzed by the flow source discovery module 206 to determine possible applications and possible network endpoints. In some embodiments, the network traffic integration module 210 is configured to retrieve flow records from network traffic software platform(s) during scheduled retrieval periods. The scheduled retrieval may be configured by the scheduling module 208. The network traffic integration module 210 may retrieve, from the input module, flow records from a specific IP address. In some embodiments, these specific IP addresses may represent flow source important to the operations of the enterprise system 100.

Figure 7:
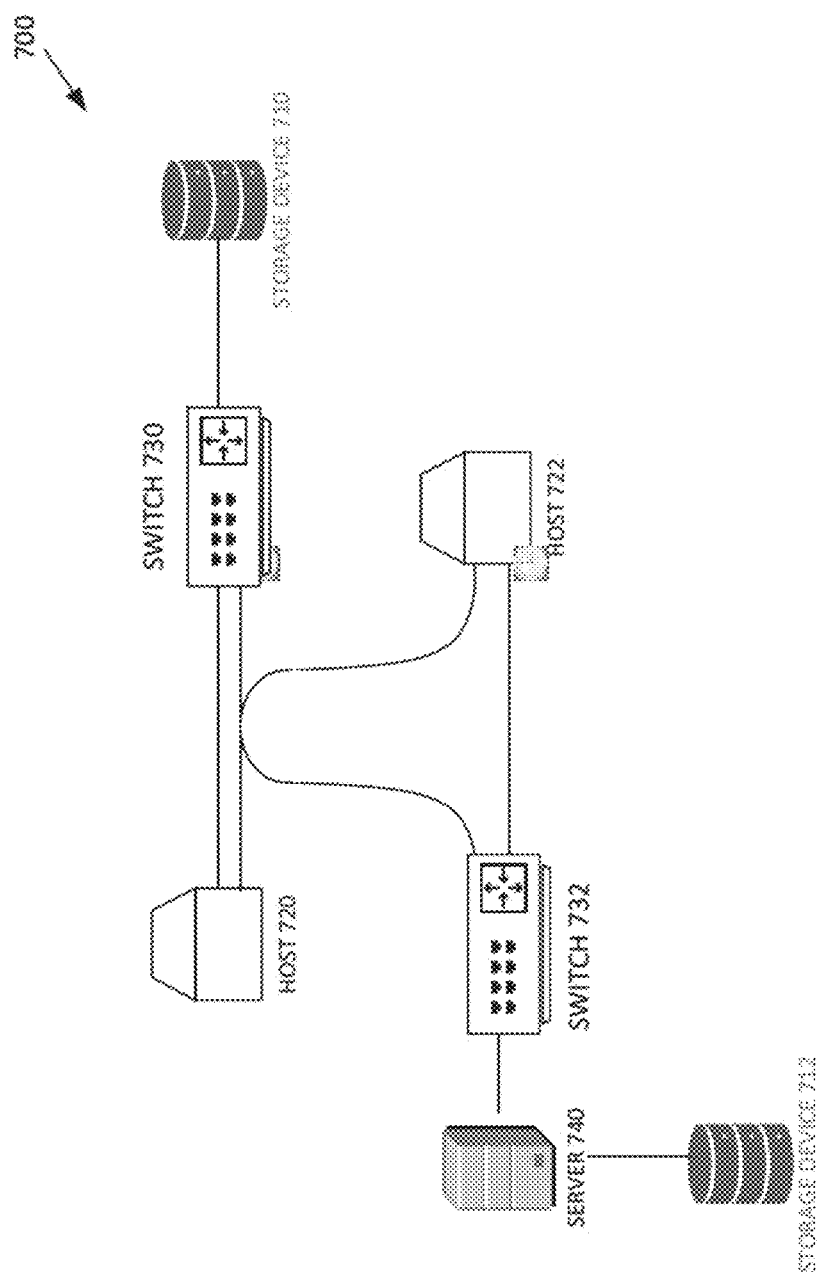
FIG. 7 depicts an example topology of an enterprise network according to some embodiments.

The infrastructure module 212 may determine a model of the infrastructure of the network 105 (e.g., topology of flow sources or switches and how the communicate with each other, entities, and/or hosts within the enterprise network 105. The infrastructure module 212 may aid users of the IPM appliance 160 with a visual representation of the infrastructure of the enterprise network 105. The infrastructure module 212 may create an infrastructure topology view and indicate how a specific router is connected to other entities of the network. FIG. 7 depicts an example topology 700 according to some embodiments. Topology 700 depicts entities such as storage devices 710 and 712, hosts 720 and 722, switches 730 and 732, and server 740. In some embodiments, the determination of the infrastructure model of the enterprise network 105 may be optional.

In addition to discovering the entities of the infrastructure, the attributes of the entities of the enterprise network 105 within the infrastructure may also be discovered. In some embodiments, the attributes of the entities of the enterprise network 105 may be utilized in the application heuristics for discovering applications.

The alarm module 214 may create alarms based on attributes of entities of the switch fabric 130. The alarm module 214 may provide a method for the IT administrator to monitor the health and performance of the entities of the switch fabric. In some embodiments, the alarm module 214 is a first line of defense by informing the IT administrator of the enterprise network 105 potential network anomalies such as DDoS attacks, SPAM, and abnormal downloads/uploads.

Figure 8:
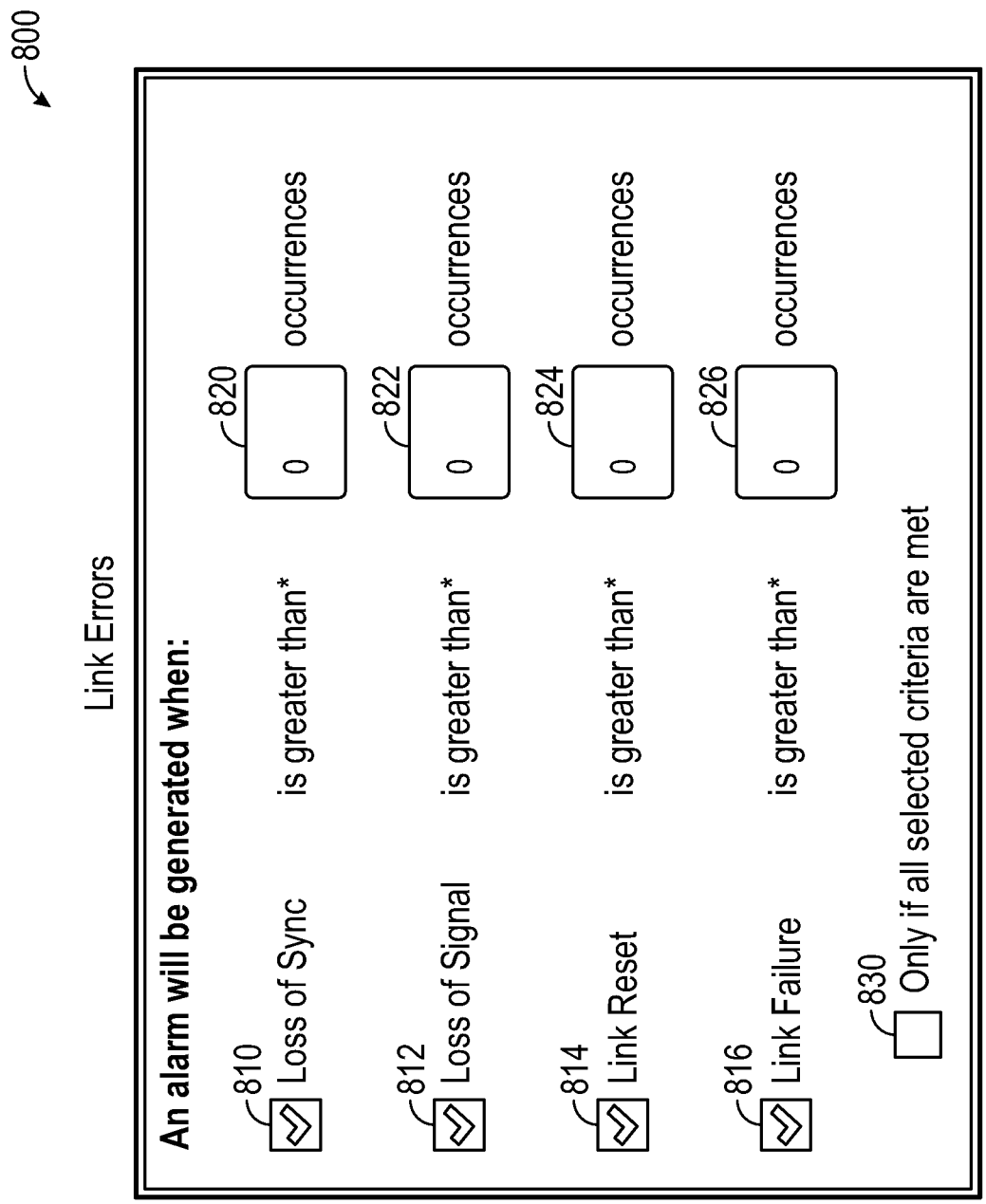
FIG. 8 depicts an example flow source discovery alarm interface according to some embodiments.

FIG. 8 depicts an example flow source discovery alarm interface 800 according to some embodiments. The alarms listed in interface 800 are associated with link errors. In one example, the alarm module 214 may generate a loss of sync alarm if the IT administrator interacts with checkbox 810, and specify a upper threshold in checkbox 820. In some embodiments, an alarm criterion for the loss of sync alarm is satisfied when there are greater than 0 occurrences of a loss of synchronization on a particular entity of the switch fabric 130. When the alarm criterion for the loss of sync alarm is satisfied, the alarm module 214 may send a request to the reporting module 216 to send a notification to the IT administrator of the trigger of this alarm. In various embodiments, the notification may be in the form of an email, a pop-up screen on the IPM appliance interface or an automated phone call.

An IT administrator may interact with checkbox 812 and specify an upper threshold in checkbox 822 to set a loss of signal threshold. In some embodiments, an alarm criterion for the loss of a signal is satisfied when there are greater than 0 occurrences of a loss of signal on a particular entity of the switch fabric 130. When the alarm criterion for the loss of signal alarm is satisfied, the alarm module 214 may send a request to the reporting module 216 to send a notification to the IT administrator (or other entity or digital device) of the trigger of this alarm. In various embodiments, the notification may be in the form of an email, a pop-up screen on the IPM appliance interface, text message, or an automated phone call.

In some embodiments, an alarm criterion for a link reset alarm is satisfied when there are greater than 0 occurrences of a link reset on a particular entity of the switch fabric 130. When the alarm criterion for the link reset alarm is satisfied, the alarm module 214 may send a request to the reporting module 216 to send a notification to the IT administrator of the trigger of this alarm. In various embodiments, the notification may be in the form of an email, a pop-up screen on the IPM appliance interface, text message, or an automated phone call.

In some embodiments, an alarm criterion for the link failure alarm is satisfied when there are greater than 0 occurrences of a link failure on a particular entity of the switch fabric 130. When the alarm criterion for the link failure alarm is satisfied, the alarm module 214 may send a request to the reporting module 216 to send a notification to the IT administrator of the trigger of this alarm. In various embodiments, the notification may be in the form of an email, a pop-up screen on the IPM appliance interface, text message, or an automated phone call.

In some embodiments, the alarm module 214 may generate an overall link alarm only when all four of the previous four alarm criteria are satisfied. When the alarm criterion for the overall link alarm is satisfied, the alarm module 214 may send a request to the reporting module 216 to send a notification to the IT administrator (or other entity or digital device) of the trigger of this alarm. In various embodiments, the notification may be in the form of an email, a pop-up screen on the IPM appliance interface, text message, or an automated phone call.

In some embodiments, the alarm module 214 may create alarms based on attributes or metrics of entities of the enterprise network 105 including entities of the switch fabric 130. For example, the alarm module 214 may create a threshold when a certain metric is exceeded, when a certain metric does not exceed a threshold, or when the certain metric satisfies a threshold.

The reporting module 216 may receive a request from the flow source datastore 222 to provide the discovered flow source entries. In response to receiving the request from the flow source datastore 222, the reporting module 216 may organize and output the data traffic metrics in a meaningful way. For example, flow sources may be output top conversations as seen by each software platform, top IP address by total bit rate, and top IP address by receive or transmit bit rate. In some embodiments, the reporting module provides the output in real time.

The reporting module 216 may provide discovered flow source entries in the form of a chart, with each flow source entry, their associated attributes of the application and entities displayed in text form. In some embodiments, the reporting module 216 may provide the discovered flow source entry in the form of a topology, showing a representative of the discovered flow source and entities of the enterprise network connected to the discovered flow source. FIG. 7 depicts an example application topology 700 according to some embodiments. Application topology 700 depicts entities, such as host 620, 710, 730, and 740, storage devices vSAN 610 and 750, and server 760. These entities comprise an example application such as a VDI application.

In some embodiments, users may interact with the discovered application entries in a discovered flow source chart by filtering the results of the chart. For example, the discovered flow source chart may be filtered to only show storage devices coupled to the discovered flow source, the results may be further filtered by specifying storage arrays of a particular size.

Figure 9:
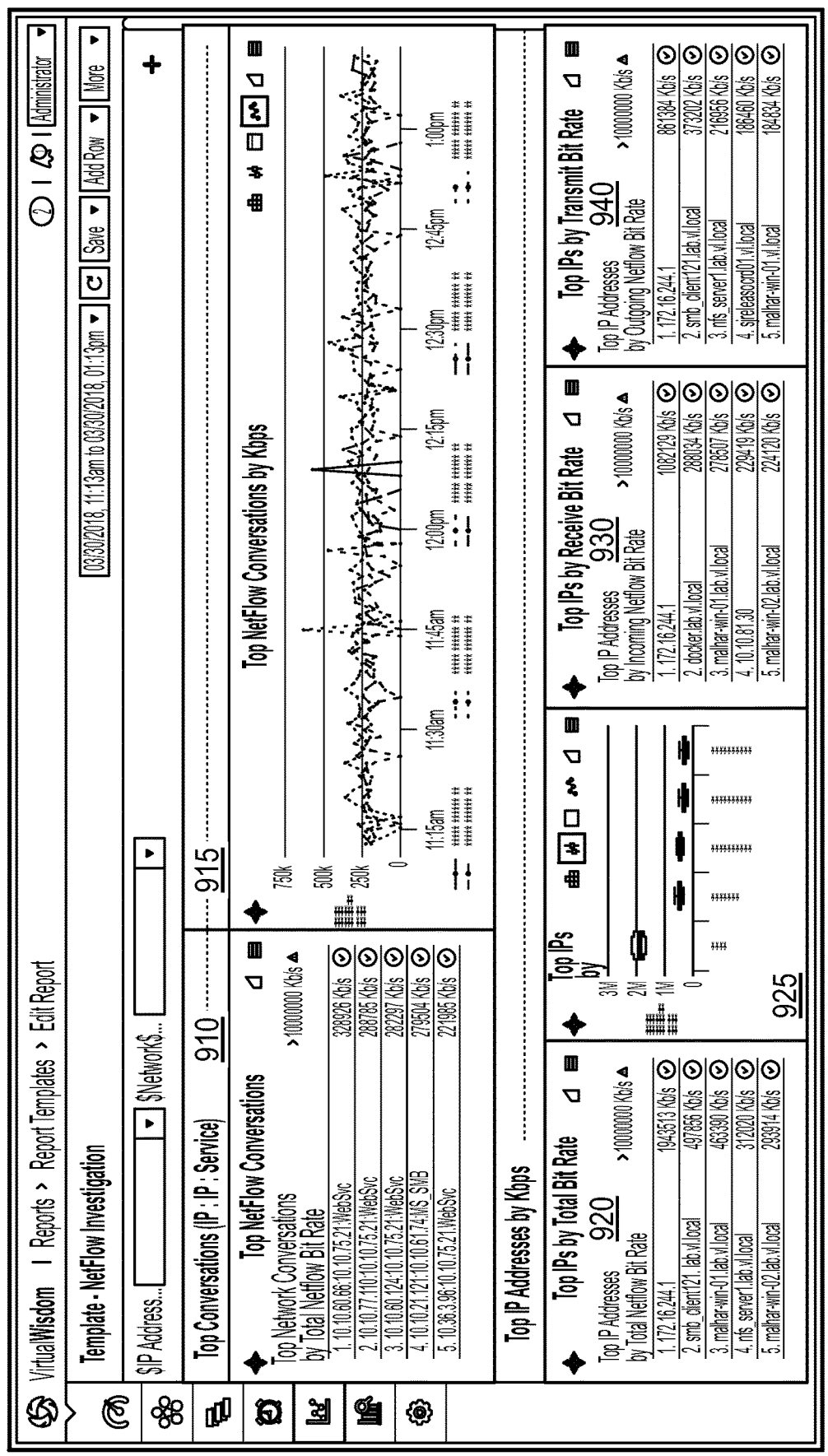
FIG. 9 depicts an example output attributes associated with entities of the switch fabric according to some embodiments.

The reporting module 216 may provide in the form of charts or graphs, attributes associated with entities of the switch fabric, attributes which may include a top IP address by total bit rate, total packet rate, top conversations, and top receive/transmit bit rate. FIG. 9 depicts an example output 900 of attributes associated with entities of the switch fabric, or the output of the flow source discovery process according to some embodiments.

For example, the reporting module 216 may be configured to provide area 910, illustrating top network conversations as seen by NetFlow or other platform in a chart form. The reporting module 216 may provide area 915, top network conversations in a graph form. The reporting module 216 may provide area 920, top IPs by total bit rate in a chart form. The reporting module 216 may provide area 925, top IPs by total bit rate in a graph form. The reporting module 216 may provide area 930, top IPs by receive bit rate in a chart form. The reporting module 216 may provide area 940, top IPs by transmit bit rate in a chart form.

The input datastore 218 may receive any number of data packets from the network traffic analyzing software platform 150 and store any number of the data packets. The input datastore 218 may receive from the flow source discovery module 206 a request for any number of data packets.

The attributes datastore 220 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). In some embodiments, the attributes datastore 220 is configured to receive the attributes or properties of entities of the enterprise network 105. Attributes and/or metrics associated with entities of the switch fabric may be received from the flow source discovery module 206. In some embodiments, the attributes datastore 220 may store a list containing entities of the switch fabric that the IT administrator wants to continue monitoring. In various embodiments, the attributes datastore 220 may store the list of attributes of the switch fabric which the IT administrator would like to continue monitoring.

The flow source datastore 222 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The flow source datastore 222 may receive a request from the communication module 202 to create or update a flow source entry. The flow source entry may include attributes and/or metrics of the discovered flow source. Attributes and/or metrics of the discovered flow sources may be organized to obtain statistics or metrics such as top conversations as seen by each software platform, top IP address by total bit rate, and top IP address by receive or transmit bit rate.

The flow source datastore 222 may receive the request from the communication module 202 to provide the discovered flow source. In turn, the flow source datastore 222 may send a request to the reporting module 216 to provide the discovered flow sources along with their associated attributes.

The infrastructure datastore 224 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The infrastructure datastore 224 may store any number of entity entries. Each entity entry may represent one or more entities of the enterprise network.

The template datastore 226 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). In some embodiments, the template datastore 226 is configured to receive the request from the communication module 202 to create the template entry. Flow records from routers/switches from different manufacturers may be differentiated with different template records. In some embodiments, the template record within a data packet may not necessarily indicate the format of flow records within the same packet.

A module may be hardware or software. In some embodiments, the module may configure one or more processors to perform functions associated with the module. Although different modules are discussed herein, it will be appreciated that the content delivery system 106 may include any number of modules performing any or all functionality discussed herein.

Figure 3:
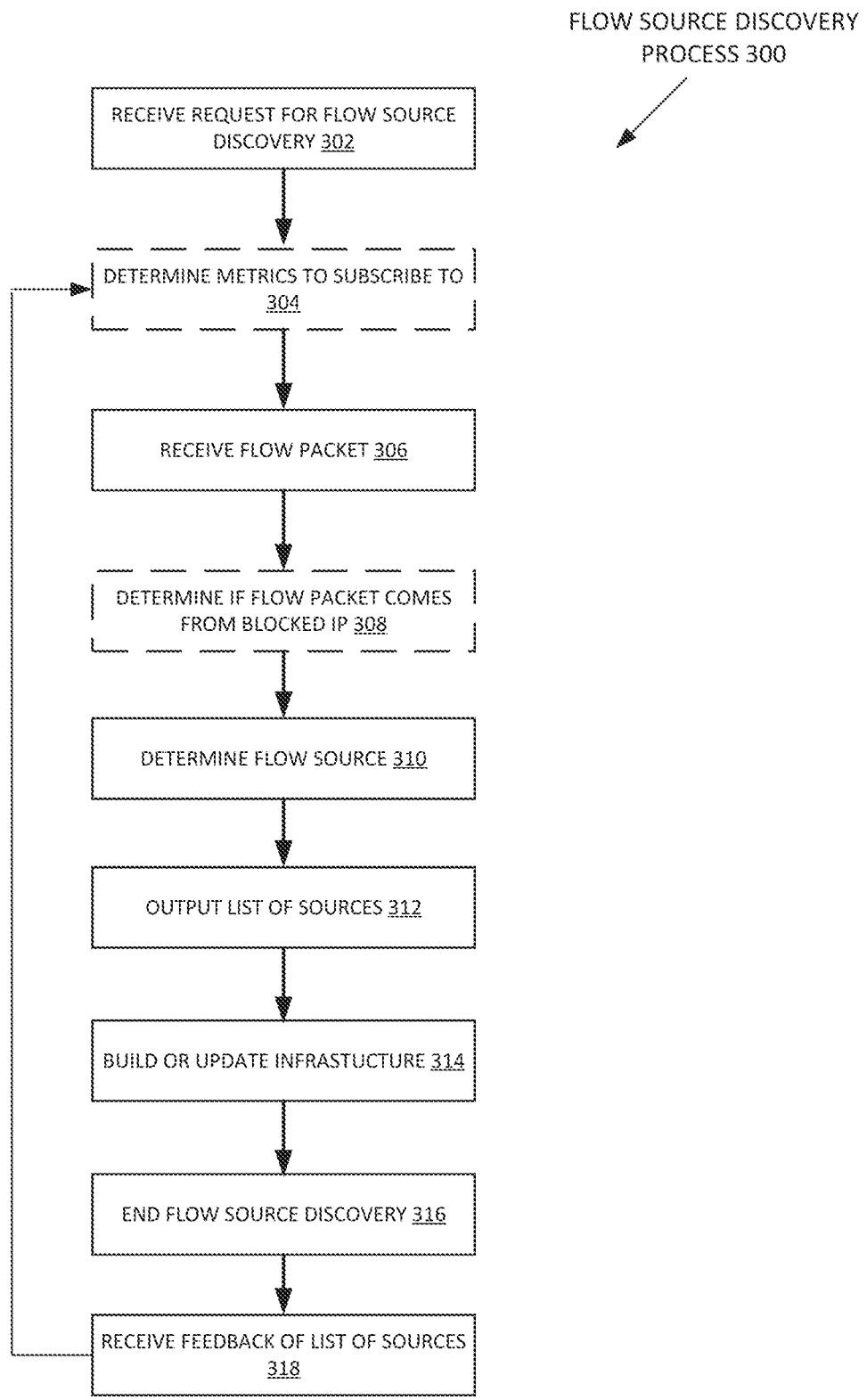
FIG. 3 depicts a flowchart of a flow source discovery process of an enterprise system according to some embodiments.

FIG. 3 depicts a flowchart 300 of a flow source discovery process of an enterprise network according to some embodiments. In step 302, the communication module 202 may facilitate execution of the flow source discovery process by sending a request to initiate or re-initiate the flow source discovery process from the scheduling module 208 to the flow source discovery module 206.

In some embodiments, The flow source discovery module 206 may receive a request to start the flow source discovery process when any number of trigger conditions are satisfied. For example, if a current time equals a predetermined start time, a trigger condition may be satisfied.

Figure 6:
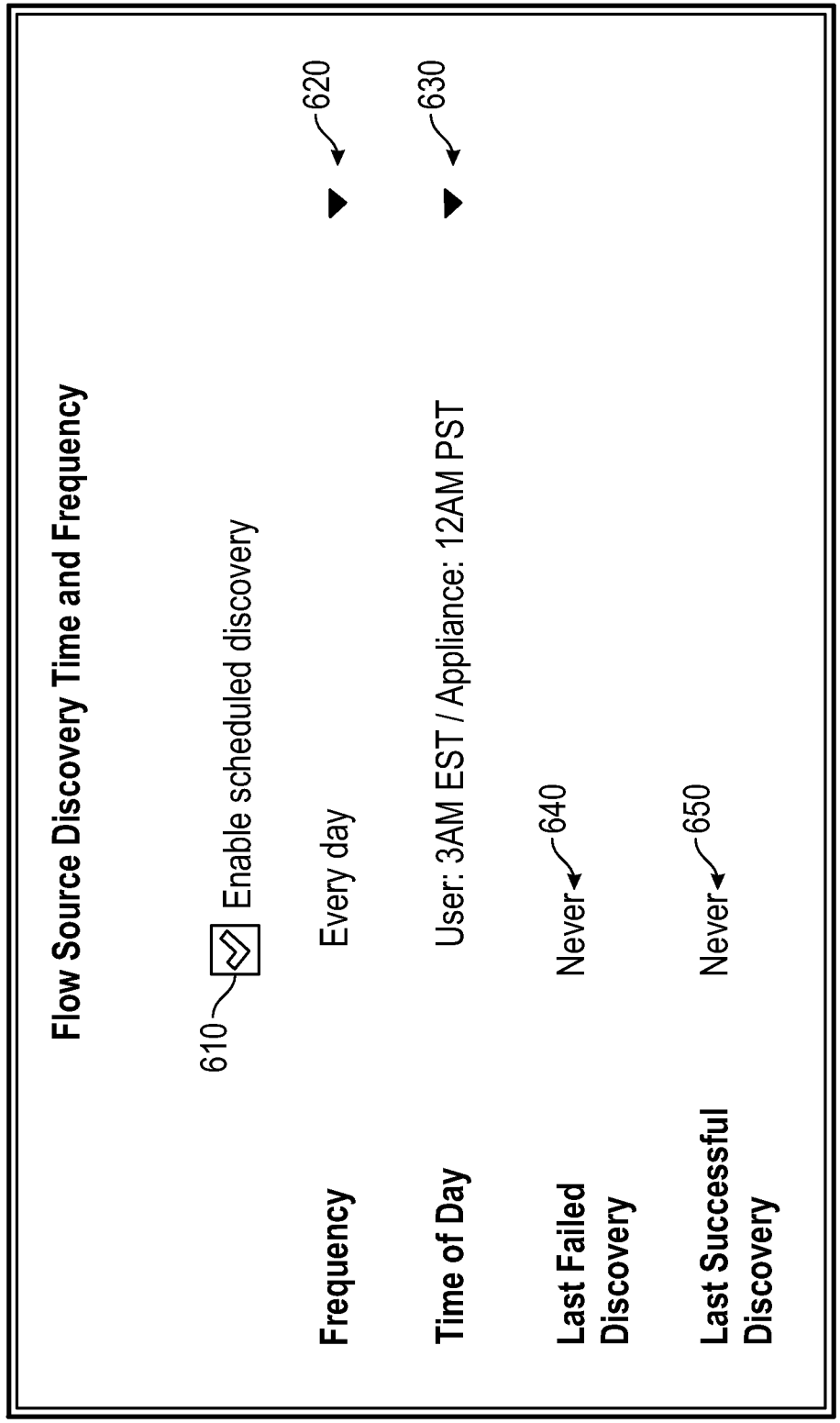
FIG. 6 depicts an example flow source discovery interface according to some embodiments.

In some embodiments, the input module 204 may receive the flow source discovery process schedule from an example flow source discovery interface 600 of FIG. 6. Pull-down field 620 may specify the day of the week that the flow source discovery process may be schedule. A start time of the flow source discovery process can be chosen using pull-down field 630. In some embodiments, the flow source discovery interface may include a field in which the user may use to specify a duration of the flow source discovery process.

In optional step 304, the flow source discovery module 206 may determine any number of attributes and/or metrics of discovered flow sources to monitor and provide. The flow source discovery module 206 may provide a set of attributes of discovered flow sources. The set of attributes and/or metrics may include: type of flow source, total byte count, incoming/outgoing byte count, incoming/outgoing bit rate, total packet rate and/or incoming/outgoing endpoint count. In subsequent flow source discovery process, the flow source discovery module 206 may monitor and output a subset of attributes of discovered flow sources.

In step 306, the network traffic integration module 210 may receive IP network traffic data from any number of network traffic analyzing software platforms 150 and/or Taps. The IP network traffic data may be in data packets. Data packets collected from different routers and switches with different network traffic analyzing software platforms may be in different formats. In some embodiments, the network traffic integration module 210 may send a request to the input datastore 218 to store any number of the data packet entries associated with each of the data packets received from the network traffic analyzing software platform 150. The flow source discovery module 206 may receive any number of the data packets from the network traffic integration module 210. In various embodiments, the flow source discovery module 206 may receive any number of data packets from the input datastore 218.

In optional step 308, the flow source discovery module 206 may determine any number of entities of the switch fabric to monitor. In an initial flow source discovery process, the flow source discovery module 206 may analyze flow records associated with all entities of the switch fabric. In response to the output of the initial flow source discovery process, the input module 204 may receive from the IT administrator of the enterprise network 105, a list of entities of the switch fabric that the IT administrator would like to continue monitoring. The flow source discovery module 206 may send a request to the attributes datastore 220 to store the list. In subsequent flow source discovery process, the flow source discovery module 206 may ignore or reject flow records from entities of the switch fabric not listed in the first list.

In step 310, the flow source discovery module 206 may analyze any number of received data packets and determine a flow source of flow records. In some embodiments, the flow source discovery module 206 does not begin to analyze any number of data packets until the end of the time frame. In various embodiments, the flow source discovery module 206 analyzes any number of data packets as it is being received by the flow source discovery module 206. Further details of step 310 can be seen in steps 402 through 430 of FIG. 4.

In step 312, the reporting module 216 may provide any number of flow source entries to an interface or report. For example, the reporting module 234 may provide any number of flow source entries in the form of a chart, with each discovered flow source entry as well as attributes associated with discovered flow sources displayed in text form. In some embodiments, entities of the enterprise network 105 found along the data path associated with the discovered flow source entry as well as attributes associated with each entity may be displayed in text or in the form of an infrastructure topology view.

In step 314, the infrastructure module 212 may build or update the infrastructure of enterprise network 105. In some embodiments, as any number of flow source entries are created or updated, the infrastructure module 212 may obtain more information regarding the connectivity of entities of the enterprise network 105.

FIG. 7 depicts an example topology 700 according to some embodiments. Topology 700 depicts entities such as storage devices 710 and 712, hosts 720 and 722, switches 730 and 732, and server 740. The infrastructure module 212 may provide other information besides the connectivity of entities in the enterprise network 105. For example, the representation of entities of the enterprise network 105 may include alarms or alerts associated with one or more entities, a clock graphic on the bottom left corner of host 722 indicates that there is an alarm associated with that particular host.

In some embodiments, once initiated, the flow source discovery process may continue until it is completed. In step 316, the flow source discovery module 206 may determine that the flow source discovery process is complete after retrieving traffic data from the one or more network traffic analyzing software platform for a fixed interval of time. In various embodiments, the flow source discovery module 206 may determine that the flow source discovery process is complete when the flow source discovery time frame is over.

In step 318, in response to the displaying or report any number of flow source entries, the input module 204 may receive information from the IT administrator. The received feedback may include a first list containing any number of entities of the switch fabric that the IT administrator wants to continue monitoring. In some embodiments, the received feedback includes a second list containing any number of attributes of the switch fabric which the IT administrator would like to continue monitoring.

The second list may be used in step 304 to determine any number of attributes or metrics of discovered flow sources to monitor and provide in subsequent flow source discovery processes. The first list may be used in step 308 to determine any number of entities of the switch fabric to monitor and provide in subsequent flow source discovery processes.

Figure 4:
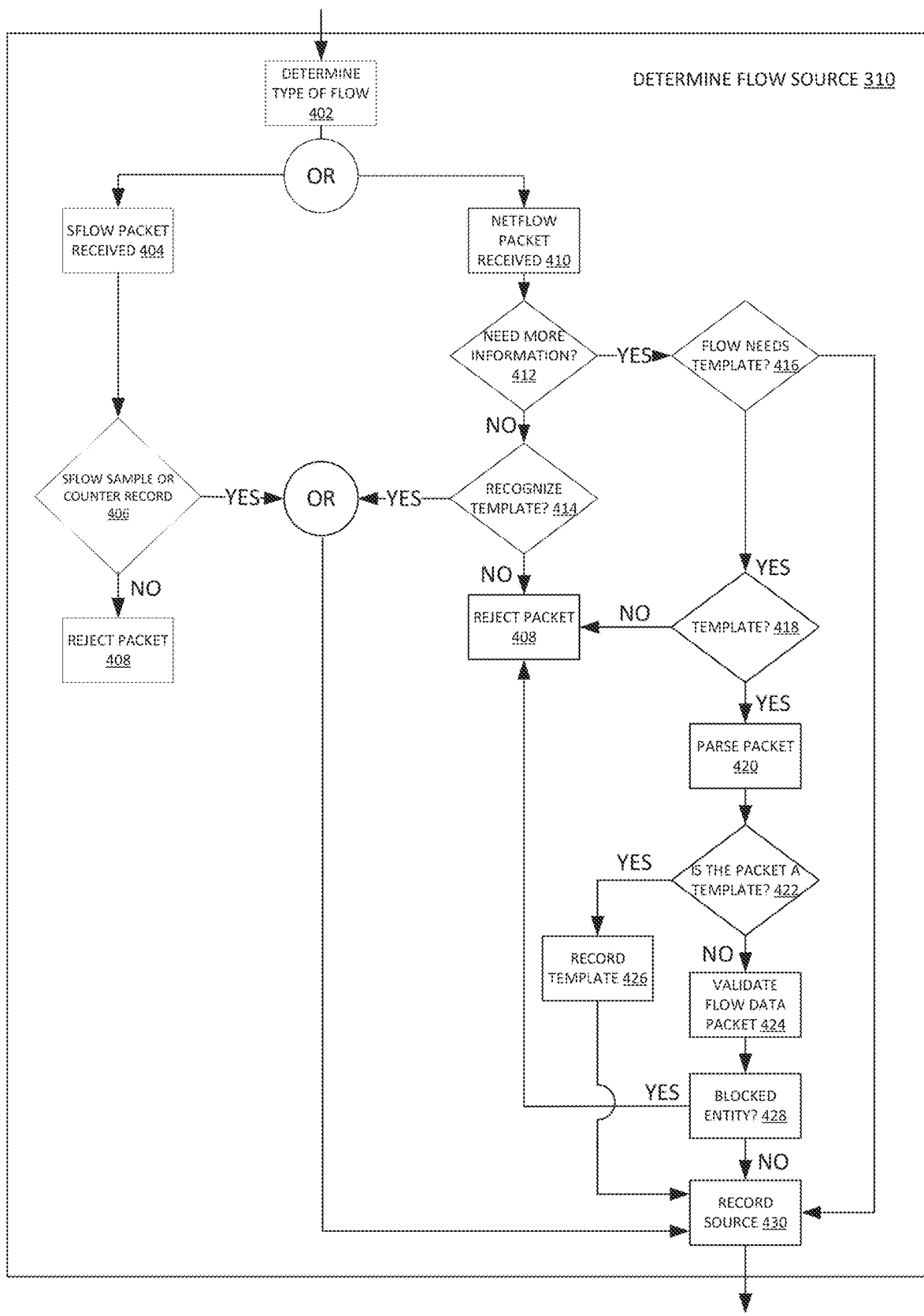
FIG. 4 depicts in further detail of one step of flow source discovery flowchart according to some embodiments.

FIG. 4 is a flow source discovery process in some embodiments. In step 402 of FIG. 4, the flow source discovery module 206 may identify the type of data packet for each of a number of incoming data packets based on format of the data packets.

For example, sFlow data packets may be generated by a variety of router/switch manufacturers. sFlow is a stateless packet protocol that is aimed at monitoring high speed networks. With sFlow data there is no notion of aggregating flow records into a data packet. Each sFlow data packet includes data components such as sFlow sample and counter record. The sFlow sample may include information such as packet length, packet encapsulation and information about the path such as the source IP address and destination IP address. The counter record may include information about the data packet sampling rate. For example, every N data packets of a particular router, where N is the sampling rate. The sampling rate may be configured by the router or switch which generates the sFlow data packet.

As discussed herein, NetFlow data packets, as opposed to sFlow data packets may be generated by a Cisco routers/switches. In some embodiments, the NetFlow data packet includes at least a packet header and at least one data flowset. The at least one data flowset may include a template flowset and a data flowset. The template flowset may include a collection of one or more template records. The data flowset being a collection of one or more flow records. The flow record documents the communication between entities of the enterprise network. The flow record may be provided by any number of flow sources found along the data path. Each flow record may include statistics or metrics regarding the flow such as the source IP address, destination IP address, next hop address, number of bytes, and the duration of the communication. In some embodiments, the flow source may aggregate any number of flows between the same source IP address and the destination IP address into one single flow with an aggregate of statistics or metrics.

While FIG. 4 contemplates differentiating sFlow data packets from NetFlow data packets and other types of packets, it will be appreciated that systems and methods discussed herein may work with any kind of data packet from any kind of network traffic analyzing platforms. The flow source discovery module 206 may receive a data packet from another network traffic analyzing platform and identify one or more templates to use to attempt to parse the data packet. Each network traffic analyzing platform may be associated with one or more templates. As such, any number of data packets from any number of network traffic analyzing platforms may be parsed using different templates and information (e.g., flow source identification, metrics, and/or attributes associated with one or more flow sources) may be identified, stored, and related to other flow sources of the switch fabric.

Returning to step 404, the flow source discovery module 206 may recognize a particular data packet as a sFlow data packet from a packet header using an sFlow template to parse the particular data packet.

If the flow source discovery module 206 determines that incoming data packet is an sFlow data packet by comparing all or some of the data in the data packet (or the data packet itself) to a template then the flow source discovery process proceeds to step 404. In one example, the flow source discovery module 206 may assess the data packet to determine if the data packet is an sFlow data packet or may apply one or more sFlow templates to parse information from the data packet to determine if the data packet is an sFlow data packet.

In step 404, the flow source discovery module 206 may determine if the incoming data packet contains is an sFlow data packet, then the flow source discovery process may proceed to step 406.

In step 406, the flow source discovery module 206 determines if the incoming sFlow data packet is an sFlow sample or a counter record by parsing the data in the packet using one or more templates. The flow source discovery module 206 may determine if the incoming sFlow data packet is in the format of the sFlow sample or the counter record.

If the flow source discovery module 206 determines that the incoming sFlow data packet is not an sFlow sample or a counter record, the flow source discovery module 206 may reject or ignore the sFlow data packet. The flow source discovery process may subsequently proceed to step 408. In step 408, the flow source discovery module 206 may optionally send a request to the input datastore 218 to delete the data packet entry associated with the incoming data packet (if the data packet entry was stored).

If the flow source discovery module 206 determines that the incoming sFlow data packet is an sFlow sample or a counter record, the flow source discovery module 206 may validate the incoming sFlow data packet, and the flow source discovery process proceeds to step 430.

In step 410, the flow source discovery module 206 may determine if the incoming data packet is a NetFlow data packet. In some embodiments, the flow source discovery module 206 determines that the incoming data packet is a NetFlow data packet by comparing the format of the incoming data packet based on one or more templates.

In step 412, the flow source discovery module 206 may determine if more information is required for the incoming NetFlow data packet. In some embodiments, the flow source discovery module 206 may compare the packet header and/or packets of the incoming NetFlow data packet to one or more templates stored in the template datastore 226. As discussed herein, flow records from routers/switches from different manufacturers may be differentiated by format and, as a result different template records may be required to parse the information depending on the format.

The flow source discovery module 206 may compare the packet header or packet to one or more templates in order to retrieve and/or parse information from the packet header or packet. The flow source discovery module 206 may then assess the retrieved information to determine if the retrieved information is of the type needed or if the retrieved information is unrecognizable (e.g., gibberish).

The flow source discovery module 206 may determine that no additional information is required to determine the flow source in the NetFlow data packet because the template to parse the information of the packet header and/or packets is accurate (e.g., the template is recognized). This may occur if the flow source discovery module 206 determines that the incoming NetFlow data packet contains a packet header and at least one data flowset, then the flow source discovery process in step 414.

If the flow source discovery module 206 does not get intelligible information by parsing the packet header and/or packets with a retrieve template, then the flow source discovery module 206 may determine that additional information is required to determine the flow source in the NetFlow data packet in step 416. This may occur if the flow source discovery module 206 does not recognize the packet header.

In some embodiments, if the flow source discovery module 206 recognizes the packet header of the incoming NetFlow data packet based on a template, the flow source discovery process proceeds to step 430 and the flow source discovery module 206 may extract the flow source from the incoming NetFlow data packet. In various embodiments, if the flow source discovery module 206 does not recognize the packet header of the incoming NetFlow data packet, the flow source discovery process proceeds to step 408 where the flow source discovery module 206 may reject or ignore the incoming NetFlow data packet and send the request to the input datastore 218 to delete the data packet entry associated with the incoming NetFlow data packet.

In step 416, the flow source discovery module 206 may determine if the incoming NetFlow data packet needs a new or different template record. In some embodiments the flow source discovery module 206 may attempt to parse data from the data packet or data packet header using any number of templates. If information is retrieved from the data packet or data packet header using one of the templates in step 418, then the information within the packet or packet header may be parsed in step 420.

In some embodiments, the incoming NetFlow data packet may not require a packet header. In various embodiments, the incoming NetFlow data packet contains one or more flow records, in which case a template record is not required to determine the flow source associated with the flow record. The flow source discovery process may proceed to step 430 and the flow source discovery module 206 may extract the flow source from the incoming NetFlow data packet. If the flow source discovery module 206 determines that the incoming NetFlow data requires a template record, then the flow source discovery process may proceed to step 418.

In step 418, the flow source discovery module 206 may determine if the incoming NetFlow data packet includes a template record. If the flow source discovery module 206 determines that the incoming NetFlow data packet does not recognize the template record which makes up a part of the incoming NetFlow data packet, the flow source discovery process may proceed to step 408 (e.g., rejecting or ignoring the packet). The flow source discovery module 206 may determine if the template record of the incoming NetFlow data packet matches one of any number of template records stored in the template datastore 226. The flow source discovery module 206 may reject the incoming NetFlow data packet and send the request to the input datastore 218 to delete the data packet entry associated with the incoming NetFlow data packet. In some embodiments, the flow source discovery module 206 may wait for a predetermined period of time after not finding a match for the template record of the incoming NetFlow data packet to one of the template records stored in the template datastore 226 before rejecting the incoming NetFlow data packet.

In step 420, the flow source discovery module 206 may parse the incoming NetFlow data packet. In some embodiments, in order to parse the flow source from the incoming NetFlow data packet, the flow source discovery module 206 may require some information about how the packet is formatted, this information may be provided by the template record. By parsing the incoming NetFlow data packet, the flow source discovery module 206 may extract any number of flowsets which make up the incoming NetFlow data packet. Any number of flowsets may include one or more template flowset and/or one or more data flowset. Once the flow source discovery module 206 has completed the parsing of the incoming NetFlow data packet, the flow source discovery process may proceed to step 422.

In step 422, the flow source discovery module 206 may determine if one of the flowsets is the template flowset. If the flowset is the template flowset, the template record may be extracted from the template flow set, and the flow source discovery process may proceed to step 426. If the flowset is not a template flowset, then the flowset is the data flowset, and the flow source discovery process may proceed to step 424.

In step 424, the flow source discovery module 206 may extract the flow record from the data flowset and validate the flow record. In some embodiments, the flow source discovery module 206 may validate the flow record by checking that the attributes flow source associated with the flow record is a valid router or switch hardware. Furthermore, the flow source discovery module 206 may confirm that the attributes associated with the flow source. The attributes of the flow source may include a type of flow source, name of the flow source, total byte count, incoming/outgoing byte count, incoming/outgoing bit rate, total packet rate, and/or incoming/outgoing endpoint count. In some embodiments, the flow source discovery module 206 may deduplicate flow records from redundant flow sources.

In step 426, the communication module 202 may facilitate the flow source discovery process by sending a request from the flow source discovery module 206 to the template datastore 226 to create or update a template entry. What is this In step 428, the flow source discovery module 206 may compare the router or switch hardware from which the flow record comes from to the first list of blocked entities of the switch fabric. The first list may be provided by the IT administrator and may be stored in the attributes datastore 220. If the router or switch from which the flow record comes from is not on the first list, then the flow source discovery module 206 may send a request to the input datastore 218 to delete the data packet entry associated with the incoming data packet.

In step 430, the communication module 202 may facilitate the flow source discovery process by sending a request from the flow source discovery module 206 to the flow source datastore 222 to create or update a flow source entry. The flow source entry may include type of flow source, source IP, destination IP of flows passing through the discovered flow source, and entities of the enterprise network 105 associated with the data flow.

Figure 10:
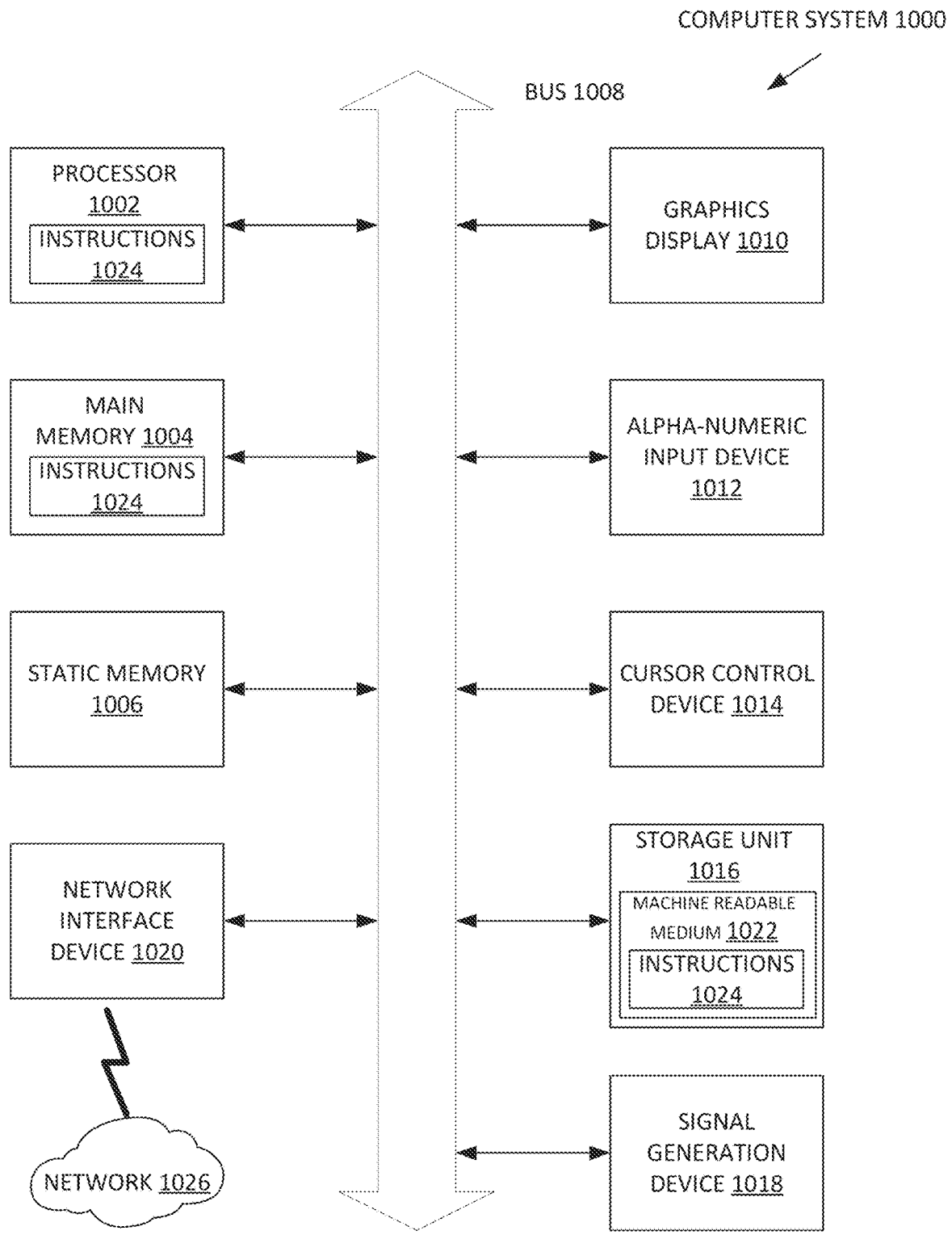
FIG. 10 depicts a block diagram illustrating entities of an example machine according to some embodiments.

FIG. 10 is a block diagram illustrating entities of an example machine able to read instructions from a machine-readable medium and execute those instructions in a processor to perform the machine processing tasks discussed herein, such as the engine operations discussed above. Specifically, FIG. 10 shows a diagrammatic representation of a machine in the example form of a computer system 1000 within which instructions 1024 (e.g., software) for causing the machine to perform any one or more of the methodologies discussed herein may be executed. In alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (SIB), a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include graphics display unit 1010 (e.g., a plasma display panel (PDP), a liquid crystal display (LCD), a projector, or a cathode ray tube (CRT)). The computer system 1000 may also include alphanumeric input device 1012 (e.g., a keyboard), a cursor control device 1014 (e.g., a mouse, a trackball, a joystick, a motion sensor, or other pointing instrument), a data store 1016, a signal generation device 1018 (e.g., a speaker), an audio input device 1026 (e.g., a microphone) and a network interface device 1020, which also are configured to communicate via the bus 1008.

The data store 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network (not shown) via network interface 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as any number of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 10.

Alternatively, hardware or software modules may be stored elsewhere within a computing system.

As referenced herein, a computer or computing system includes hardware elements used for the operations described here regardless of specific reference in FIG. 10 to such elements, including for example one or more processors, high speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:
one or more processors; and
memory containing instructions configured to control the one or more processors to:
receive a period of time for flow source discovery of an enterprise network;
receive network traffic data from network traffic analyzing platforms, including a first network traffic analyzing platform and a second network traffic analyzing platform, the network traffic analyzing platforms being in communication with the enterprise network, the network traffic data indicating network traffic into and out of flow sources of the enterprise network, at least one flow source of the flow sources of the enterprise network being a router of switch fabric integrated within the enterprise network, at least some of the network traffic data being in a form of flow packets, the first network traffic analyzing platform generating a first flow packet type, the second network traffic analyzing platform generating a second flow packet type, the first network traffic analyzing platform not being capable of generating flow packets of the second type and the second network traffic analyzing platform not being capable of generating flow packets of the first type;
for each particular flow packet:
identify the particular flow packet as belonging to one of at least two flow packet types based at least in part on a format of the particular flow packet;
when the particular flow packet is of the first flow packet type, identify a flow source of the particular flow packet and at least one metric of the network traffic data, the flow source being one of a plurality of flow sources of the enterprise network, and update a flow source data structure to include the identified flow source and the at least one metric of the network traffic data; and
when the particular flow packet is the second flow packet type, the second flow packet type being different from the first flow packet type, identify the flow source associated with the particular flow packet and at least one metric of the network traffic data, and update the flow source data structure to include the identified flow source and the at least one metric of the network traffic data; and
after termination of the period of time, output the flow source data structure, the flow source data structure including the identified flow sources and a plurality of metrics including the at least one metric of the network traffic data associated with at least one of the identified flow sources, the flow source data structure enabling an operator of the enterprise network to control and monitor network traffic of the enterprise network.

2. The system of claim 1, further comprising: wherein the at least two flow packet types include an sFlow flow packet type and a Netflow packet type.

3. The system of claim 1, further comprising:
wherein the metrics of the network traffic data including at least one of a type of flow source, read speed total byte count, incoming byte count, outgoing byte count, incoming bit rate, outgoing bit rate, and total packet rate.

4. The system of claim 3, the memory containing instructions further configured to control the one or more processors to:
identify a first flow packet of one of at least two packet types, the first flow packet indicating a first flow source, a first value of a first metric of the network traffic data and a first value of a second metric of the network traffic data;
identify a second flow packet of one of at least two packet types, the second flow packet indicating a second flow source, the first value of the first metric of the network traffic data, and the first value of the second metric of the network traffic data; and
determine that the first flow packet and the second flow packet represent duplicate network traffic.

5. The system of claim 4, further comprising, wherein the first flow packet and the second flow packet are of different packet types.

6. The system of claim 4, further comprising, wherein the first flow packet and the second flow packet are of a same packet type.

7. The system of claim 1, further comprising, wherein the flow source data structure is a table.

8. The system of claim 1, further comprising, wherein the flow source data structure is a chart.

9. The system of claim 4, further comprising wherein the second flow packet type is a Netflow packet.

10. The system of claim 4 further comprising: wherein the second flow packet type is a Jflow packet.

11. A method comprising:
receiving a period of time for flow source discovery of an enterprise network;
receiving network traffic data from network traffic analyzing platforms, including a first network traffic analyzing platform and a second network traffic analyzing platform, the network traffic analyzing platforms being in communication with the enterprise network, the network traffic data indicating network traffic into and out of flow sources of the enterprise network, at least one flow source of the flow sources of the enterprise network being a router of switch fabric integrated within the enterprise network, at least some of the network traffic data being in a form of flow packets, the first network traffic analyzing platform generating a first flow packet type, the second network traffic analyzing platform generating a second flow packet type, the first network traffic analyzing platform not being capable of generating flow packets of the second type and the second network traffic analyzing platform not being capable of generating flow packets of the first type;
for each particular flow packet, identifying the particular flow packet as belonging to one of at least two flow packet types based at least in part on a format of the particular flow packet;

when the particular flow packet is of the first flow packet type, identifying a flow source of the particular flow packet and at least one metric of the network traffic data, the flow source being one of a plurality of flow sources of the enterprise network, and update a flow source data structure to include the identified flow source and the at least one metric of the network traffic data;

when the particular flow packet is the second flow packet type, the second flow packet type being different from the first flow packet type, identifying the flow source associated with the particular flow packet and at least one metric of the network traffic data, and update the flow source data structure to include the identified flow source and the at least one metric of the network traffic data; and after termination of the period of time, outputting the flow source data structure, the flow source data structure including the identified flow sources and a plurality of metrics including the at least one metric of the network traffic data associated with at least one of the identified flow sources, the flow source data structure enabling an operator of the enterprise network to control and monitor network traffic of the enterprise network.

12. The method of claim 11 wherein the at least two flow packet types include an sFlow flow packet type and a Netflow packet type.

13. The method of claim 11, wherein the metrics of the network traffic data including at least one of a type of flow source, read speed total byte count, incoming byte count, outgoing byte count, incoming bit rate, outgoing bit rate, and total packet rate.

14. The method of claim 11 further comprising:
identifying a first flow packet of one of at least two packet types, the first flow packet indicating a first flow source, a first value of a first metric of the network traffic data and a first value of a second metric of the network traffic data;
identifying a second flow packet of one of at least two packet types, the second flow packet indicating a second flow source, the first value of the first metric of the network traffic data, and the first value of the second metric of the network traffic data; and
determining that the first flow packet and the second flow packet represent duplicate network traffic.

15. The method of claim 14, wherein the first flow packet and the second flow packet are of different packet types.

16. The method of claim 14, wherein the first flow packet and the second flow packet are of a same packet types.

17. A computer program product comprising a non-transitory computer readable storage medium having a program code embodied therewith, the program code executable by a computing system to cause the computing system to perform:
receiving a period of time for flow source discovery of an enterprise network;
receiving network traffic data from network traffic analyzing platforms, including a first network traffic analyzing platform and a second network traffic analyzing platform, the network traffic analyzing platforms being in communication with the enterprise network, the network traffic data indicating network traffic into and out of flow sources of the enterprise network, at least one flow source of the flow sources of the enterprise network being a router of switch fabric integrated within the enterprise network, at least some of the network traffic data being in a form of flow packets, the first network traffic analyzing platform generating a first flow packet type, the second network traffic analyzing platform generating a second flow packet type, the first network traffic analyzing platform not being capable of generating flow packets of the second type and the second network traffic analyzing platform not being capable of generating flow packets of the first type;

for each particular flow packet, identifying the particular flow packet as belonging to one of at least two flow packet types based at least in part on a format of the particular flow packet;

when the particular flow packet is of the first flow packet type, identifying a flow source of the particular flow packet and at least one metric of the network traffic data, the flow source being one of a plurality of flow sources of the enterprise network, and update a flow source data structure to include the identified flow source and the at least one metric of the network traffic data;

when the particular flow packet is the second flow packet type, the second flow packet type being different from the first flow packet type, identifying the flow source associated with the particular flow packet and at least one metric of the network traffic data, and update the flow source data structure to include the identified flow source and the at least one metric of the network traffic data; and after termination of the period of time, outputting the flow source data structure, the flow source data structure including the identified flow sources and a plurality of metrics including the at least one metric of the network traffic data associated with at least one of the identified flow sources, the flow source data structure enabling an operator of the enterprise network to control and monitor network traffic of the enterprise network.

18. The computer program product of claim 17, the program code executable by the computing system to cause the computing system to further perform:
identifying a first flow packet of one of at least two packet types, the first flow packet indicating a first flow source, a first value of a first metric of the network traffic data and a first value of a second metric of the network traffic data;
identifying a second flow packet of one of at least two packet types, the second flow packet indicating a second flow source, the first value of the first metric of the network traffic data, and the first value of the second metric of the network traffic data; and
determining that the first flow packet and the second flow packet represent duplicate network traffic.

* * * * *